(12) United States Patent
Kohli et al.

(10) Patent No.: US 11,249,977 B2
(45) Date of Patent: Feb. 15, 2022

(54) METHOD AND SYSTEM FOR STORAGE AND TRANSFER OF VERIFIED DATA VIA BLOCKCHAIN

(71) Applicant: MASTERCARD INTERNATIONAL INCORPORATED, Purchase, NY (US)

(72) Inventors: Manoneet Kohli, O'Fallon, MO (US); Rick Unnerstall, O'Fallon, MO (US); Ankur Arora, New Delhi (IN); Shuvam Sengupta, Haryana (IN); Pulkit Gupta, Gurgaon (IN); Nishant Maheshwari, Uttar Pradesh (IN); Shreya Mittal, Delhi (IN); Manish Kumar, Gurgaon (IN); Vikas Bishnoi, Rajasthan (IN); Shubham Bijawat, Haryana (IN); Jaipal Singh Kumawat, Rajasthan (IN); Navneet Kumar, Bihar (IN); Lakshmi Sushma Daggubati, O'Fallon, MO (US); Sri Chaitanya Sanaboina, O'Fallon, MO (US); Deepak Yadav, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 417 days.

(21) Appl. No.: 15/910,169

(22) Filed: Mar. 2, 2018

(65) Prior Publication Data

US 2018/0253464 A1 Sep. 6, 2018

Related U.S. Application Data

(60) Provisional application No. 62/466,573, filed on Mar. 3, 2017, provisional application No. 62/523,313, filed on Jun. 22, 2017.

(51) Int. Cl.
*G06F 16/23* (2019.01)
*G06F 16/21* (2019.01)
*H04L 9/32* (2006.01)

(52) U.S. Cl.
CPC ........ *G06F 16/2365* (2019.01); *G06F 16/219* (2019.01); *H04L 9/3236* (2013.01); *H04L 9/3247* (2013.01); *H04L 2209/38* (2013.01)

(58) Field of Classification Search
CPC . G06F 16/2365; G06F 16/219; H04L 9/3236; H04L 9/3247; G04L 2209/38
See application file for complete search history.

(56) References Cited

U.S. PATENT DOCUMENTS

| 9,569,771 B2 | 2/2017 | Lesavich et al. |
| 2015/0081566 A1* | 3/2015 | Slepinin ............. G06Q 20/3678 705/69 |

(Continued)

FOREIGN PATENT DOCUMENTS

| EP | 1 349 034 A2 | 10/2003 |
| EP | 2 110 981 A1 | 10/2009 |
| WO | 2017/004527 A1 | 1/2017 |

OTHER PUBLICATIONS

Nakamoto, "Bitcoin: A Peer-to-Peer Electric Cash System", nakamotoinstitute.org, Oct. 31, 2008, pp. 1-9.

(Continued)

*Primary Examiner* — Kannan Shanmugasundaram
(74) *Attorney, Agent, or Firm* — Buchanan Ingersoll & Rooney PC

(57) ABSTRACT

A method for verified data storage via blockchain includes: storing a blockchain comprised of a plurality of blocks, each comprised of a block header and a plurality of transaction values, the block header including a timestamp; receiving a transaction notification including an entity identifier and data values; validating the data values based on a validation notification received from a verifying entity; generating a new block header comprised of a current timestamp, a block reference value, and a transaction reference value, the block reference value being generated via hashing of the block header included in a most recent block based on the timestamp, and the transaction reference value being generated (Continued)

via hashing of new transaction values including the data values; generating a new block comprised of the generated new block header and the new transaction values; and transmitting the new block to a node associated with the blockchain.

20 Claims, 7 Drawing Sheets

(56) References Cited

U.S. PATENT DOCUMENTS

| | | | |
|---|---|---|---|
| 2016/0125040 A1* | 5/2016 | Kheterpal | G06F 16/951 |
| | | | 707/776 |
| 2016/0342978 A1 | 11/2016 | Davis et al. | |
| 2017/0017958 A1 | 1/2017 | Scott et al. | |
| 2017/0046652 A1 | 2/2017 | Haldenby et al. | |
| 2017/0243214 A1* | 8/2017 | Johnsrud | G06Q 20/3823 |
| 2018/0097635 A1* | 4/2018 | Moses | H04L 9/3247 |

OTHER PUBLICATIONS

Wood, "Ethereum: A Secure Decentralised Generalised Transaction Ledger Final Draft—Under Review", Jun. 4, 2014, pp. 1-29.
Notification of Transmittal of the International Search Report and the Written Opinion of the International Searching Authority (Forms PCT/ISA/220, PCT/ISA/210 and PCT/ISA/237) dated Jun. 13, 2018, by the European Patent Office in corresponding International Application No. PCT/US2018/020727. (14 pages).

* cited by examiner

US 11,249,977 B2

METHOD AND SYSTEM FOR STORAGE AND TRANSFER OF VERIFIED DATA VIA BLOCKCHAIN

FIELD

The present disclosure relates to the storage and distribution of verified data via a blockchain, specifically the use of a blockchain to store data related to transactions between two entities where the data is verified by a third party entity prior to storage in the blockchain, where the blockchain is used as an immutable, decentralized ledger for reliable storage and use of the data.

BACKGROUND

There are many instances where an individual or other entity, such as a partnership or corporation, may need to present data to an entity requesting information from the individual. For example, a potential employer may want a verified work history for an individual looking to be hired. Traditionally, the individual or other entity would have to possess and retain paper or electronic documents, which must be made available to the requesting entity. In many cases, it may be difficult for the individual or other entity to maintain possession of such documents over a long period of time, to recall where the documents are stored when needed, and to present them to the requesting entity. Even still, once such documents are presented to the requesting entity, the requesting entity must evaluate the authenticity of the documents to ensure that they are genuine and not falsified. In many cases, this may involve significant time and effort expended by employees of the requesting entity.

In an effort to improve data collection and authentication, electronic data files are often used, where the files themselves may be authenticated via metadata and where such data is harder to falsify for the average individual. In addition, electronic data files may be more easily conveyed to the requesting entity, such as via e-mail or a flash drive. However, the data may still have to be verified and authenticated by an employee of the requesting entity. In addition, such methods still rely on the individual or other entity to obtain and retain such data to be made available for providing to a requesting entity.

Thus, there is a need for a technological solution whereby data may be verified prior to storage and may be stored and made available in such a way that a requesting entity can quickly and easily obtain the data without having to perform further authentication, and without requiring the individual or other entity to maintain possession of the data over time.

SUMMARY

The present disclosure provides a description of systems and methods for the stored of verified data via blockchain. Data is supplied to a system that is configured to add data related to data transactions to a blockchain. The system verifies the supplied data via one or more entities that are familiar with the transaction, in addition to the parties to the transaction, to ensure the accuracy of the data. The data is then stored in a blockchain in a manner that is uniquely associated with at least an individual or other entity involved in the data transaction, such that the blockchain contains a record of all data associated therewith that may be needed to be made available to a requesting entity. As a result, the blockchain stores an immutable record of all data associated with the individual or other entity that is verified prior to storage such that the requesting entity can quickly and efficiently identify and review the data associated with the individual or other entity for use.

A method for verified data storage via blockchain includes: storing, in a memory of a processing server, a blockchain comprised of a plurality of blocks, wherein each block is comprised of at least a block header and a plurality of transaction values, the block header including at least a timestamp; receiving, by a receiving device of the processing server, a transaction notification, wherein the transaction notification includes at least an entity identifier associated with an entity involved a data transaction and one or more data values; validating, by a validation module of the processing server, the one or more data values based on at least a validation notification received from a verifying entity; generating, by a generation module of the processing server, a new block header comprised of at least a current timestamp, a block reference value, and a transaction reference value, wherein the block reference value is generated via hashing of the block header included in a most recent block of the plurality of blocks based on the included timestamp, and the transaction reference value is generated via hashing of one or more new transaction values including at least one new transaction value that includes the one or more data values; generating, by the generation module of the processing server, a new block comprised of at least the generated new block header and the one or more new transaction values; and electronically transmitting, by a transmitting device of the processing server, the generated new block to a node associated with the blockchain.

A system for verified data storage via blockchain includes: a memory of a processing server configured to store a blockchain comprised of a plurality of blocks, wherein each block is comprised of at least a block header and a plurality of transaction values, the block header including at least a timestamp; a receiving device of the processing server configured to receive a transaction notification, wherein the transaction notification includes at least an entity identifier associated with an entity involved a data transaction and one or more data values; a validation module of the processing server configured to validate the one or more data values based on at least a validation notification received from a verifying entity; a generation module of the processing server configured to generate a new block header comprised of at least a current timestamp, a block reference value, and a transaction reference value, wherein the block reference value is generated via hashing of the block header included in a most recent block of the plurality of blocks based on the included timestamp, and the transaction reference value is generated via hashing of one or more new transaction values including at least one new transaction value that includes the one or more data values, and generate a new block comprised of at least the generated new block header and the one or more new transaction values; and a transmitting device of the processing server configured to electronically transmit the generated new block to a node associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Verification and Storage of Data via Blockchain

Figure 1:
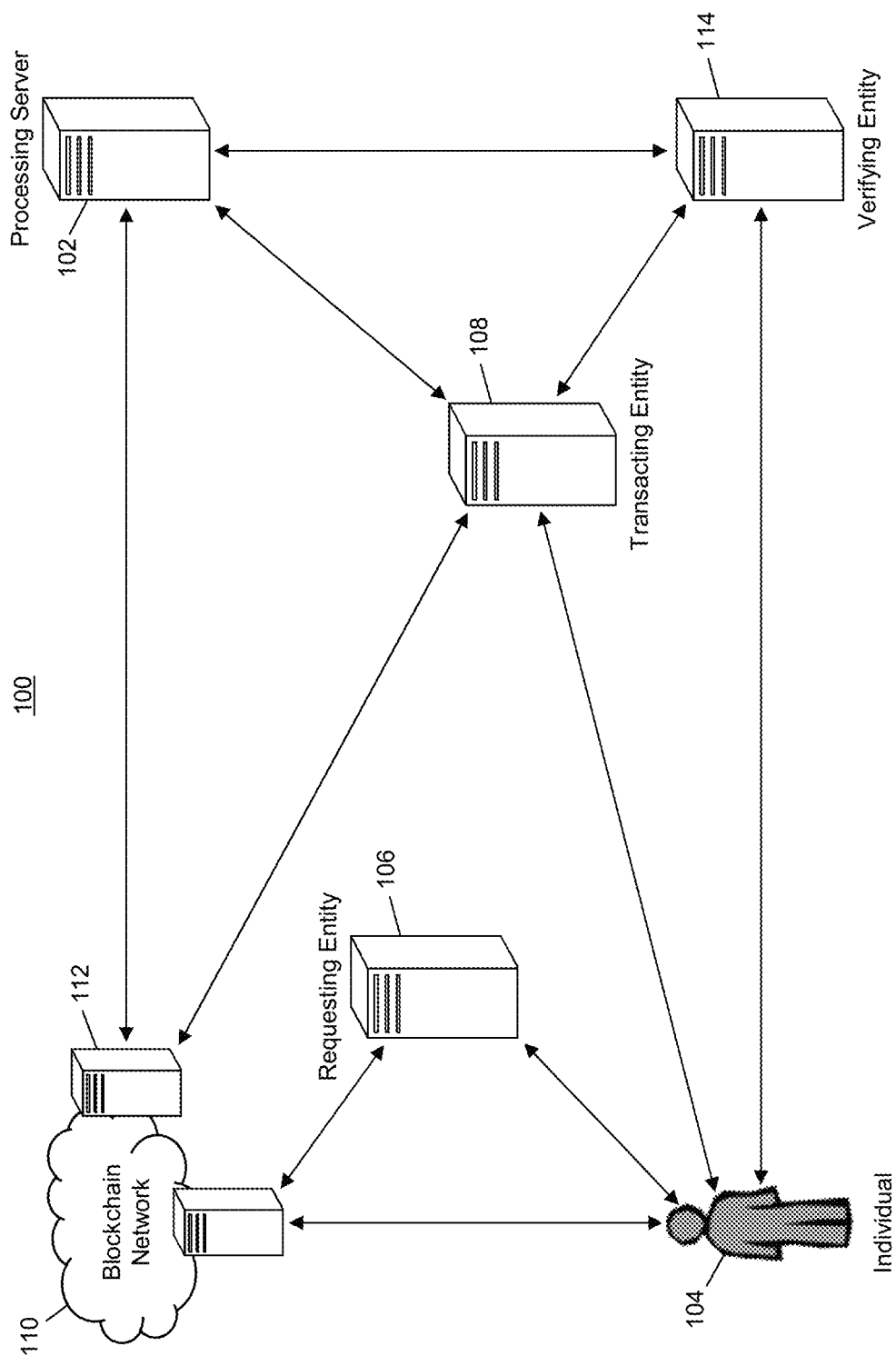
FIG. 1 is a block diagram illustrating a high level system architecture for the storage of verified data via blockchain in accordance with exemplary embodiments.

FIG. 1 illustrates a system 100 for the verification of data related to a data transaction involving at least two entities and the storage thereof in a blockchain, where the blockchain data is directly associated with at least one of the entities involved in the data transaction for subsequent identification thereof.

The system 100 may include a processing server 102. The processing server 102, discussed in more detail below, may be configured to verify data that is received that is related to a data transaction involving an individual 104 for storage via a blockchain. In the system 100, a requesting entity 106 may request data from an individual 104. As discussed herein, the individual 104 may refer to a person or any other entity as applicable to the processes and functions discussed herein, such as a business, municipality, etc. Data may be received from the individual 104 as part of the processes discussed herein through any suitable method, such as via the use of a computing device or other type of input device used by the individual 104, such as a desktop computer, laptop computer, tablet computer, notebook computer, cellular phone, smart phone, smart watch, smart television, wearable computing device, implantable computing device, etc. The requested data may include data related to the individual 104 and past data transactions involving the individual 104 and various transacting entities 108. Rather than having to manually provide the data to the requesting entity 106 via physical or electronic documents or other methods, the data may be stored via a blockchain that is accessible by the requesting entity 106, and where the data is pre-verified via the processing server 102 such that the requesting entity 106 is not required to verify or authenticate the data, and where the individual 104 does not have to retain, possess, or supply the data themselves.

In the system 100, the individual 104 may participate in a data transaction with a transacting entity 108. Examples of such data transactions and the entities illustrated in the system 100 in FIG. 1 and discussed herein are discussed in more detail below. For instance, the transacting entity 108 may be an employer that employs the individual 104, where the data transaction is the employment of the individual 104 by the transacting entity 108. In order to have data associated with the data transaction stored in a blockchain, the individual 104 and/or the transacting entity 108 may electronically transmit data associated with the data transaction to the processing server 102 using a suitable communication network and method. For instance, the processing server 102 may supply an application program, web interface, application programming interface, or other suitable method for the transmission of data thereto. The data associated with the data transaction may be any data that may be needed by a requesting entity 106 in the future or may otherwise be relied on by the individual 104. For instance, in the above example, the data may be an employee identification number associated with the individual 104, the name of the transacting entity 108, the individual's position, dates of employment of the individual 104, the salary of the individual 104, benefits information, etc.

The processing server 102 may receive the data associated with the data transaction. The processing server 102 may then initiate processes for verification of the data. In some instances, the processing server 102 may first request verification from the other entity or entities involved in the transaction. For example, if the data is submitted by the individual 104, the processing server 102 may contact the transacting entity 108 for verification and vice versa. In cases where more than two entities may be involved in the transaction, the processing server 102 may contact each of the involved entities for verification. In one embodiment, verification may include electronic transmission of the submitted data to the entity (e.g., the individual 104 or a transacting entity 108) by the processing server 102, where the entity may verify that the data is accurate, and return a confirmation to the processing server 102. In another embodiment, the processing server 102 may electronically transmit only a portion of the data or other data identifying the data transaction to the entity, where the entity may return data associated with the data transaction back to the processing server 102, which the processing server 102 can then compare to the data initially supplied to verify that the data is accurate (e.g., both sets of supplied data match).

Once the data has been verified by each of the parties directly involved in the data transaction, if applicable, the processing server 102 may request verification of the data by a third party, verifying entity 114. The verifying entity 114 may be an entity that is associated with the data transaction and/or one of the entities involved therein, but may not be directly involved in the transaction itself. For instance, in the above example, the verifying entity 114 may be a financial institution that receives salary payments from the employer to the employee, a benefits agency that provides benefits to the individual 104 as part of their employment with the employer, a government agency that receives proof of the employment of the individual 104 at the employer (e.g., the United States Internal Revenue Service receiving forms regarding salary paid to the individual 104 by the employer), etc. The processing server 102 may communicate with the verifying entity 114 to verify the data transaction therewith, such as by providing the verifying entity 114 with the supplied data and requesting confirmation thereof, or by providing the verifying entity 114 with data identifying the data transaction and requesting data associated therewith for comparison to the supplied data.

For instance, in the above example, the supplied data associated with the data transaction may include a name of the individual 104 and of the employer as the transacting entity 108, where the names may be provided to the verifying entity 114. In some cases, the supplied data may include information for use in identifying a suitable verifying entity 114, such as the name or contact information of a financial institution or benefits agency that may be used for verification. The verifying entity 114 may then identify any data associated with employment of the individual 104 at the stated employer and return the data to the processing server 102. The processing server 102 may then compare the data supplied by the verifying entity 114 with the data supplied by the individual 104 and/or transacting entity 108. If the data matches, the data may be considered to be verified. For instance, the verifying entity 114 may provide data that is an exact match to the supplied data (e.g., exact names of the individual 104 and the employer and dates of employment) or data that may correspond to the supplied data (e.g., the employer's legal name, which may vary from the name provided in the supplied data) and be matched thereto by the processing server 102 using suitable methods (e.g., lookup tables, third party data sources, etc.). For example, the individual 104 may be paid by "Entity Accounts, L.L.C.," which may be a subsidiary of "Entity Employer," as the employer provided by the individual 104 in the supplied data. If the data does not match, the processing server 102 may contact the individual 104 and/or one or more of the transacting entities 108 for notification thereof, and may, in some cases, request updating of the supplied data for further verification.

Once the data related to the data transaction has been verified, the processing server 102 may submit the data for inclusion in a blockchain associated with a blockchain network 110. The blockchain network 110 may be comprised of a plurality of nodes, which may be computing device specifically configured to generate and verify blocks for addition to the blockchain and for the storage of the blockchain. In some embodiments, the processing server 102 may be a node 112 in the blockchain network 110. In such embodiments, the processing server 102 may be configured to generate blocks for verification and addition to the blockchain using the methods discussed herein.

The blockchain may be comprised of a plurality of blocks. Each block may be comprised of at least a block header and one or more transaction values, where each transaction value includes data related to a data transaction. The block header may be comprised of at least a timestamp, a block reference value, and a transaction reference value. The timestamp may be a representation of the time when the block header was generated for addition to the blockchain. The block reference value may be a reference to the block most recently added to the blockchain prior to the respective block. The block reference value may be generated by hashing the block header of the prior block via the application of one or more hashing algorithms thereto. The prior block may be identified via the timestamp included in the block header thereof. For instance, when a block header is being generated for a new block, the block most recently added to the blockchain may be identified via the timestamp, and the block header of that block hashed to obtain the block reference value being included in the new block.

The transaction reference value may be a reference to the one or more transaction values included in the block. The transaction reference value may be generated by hashing the transaction values that are to be included in the block via the application of one or more hashing algorithms thereto. In some embodiments, the transaction reference value may be the root of a Merkle tree generated for the transaction values via hashing. In such embodiments, the transaction values may be ordered using a predetermined method prior to the generation of the Merkle tree. In the system 100, the data for the data transaction involving the individual 104 and the transacting entity or entities 108 may be included in a transaction value, which may be hashed for generation of the transaction reference value and included in a new block generated by a node 112 (e.g., or the processing server 102) that is then verified by other nodes 112 using traditional methods associated therewith and included in the blockchain associated with the blockchain network 110. Additional information regarding the blocks, blockchains, and verification of blocks by blockchain nodes 112 can be found in U.S. patent application Ser. No. 15/163,007, filed May 24, 2016, by Steven C. Davis, which is herein incorporated by reference in its entirety.

The data associated with the data transaction may be uniquely associated with the individual 104 for identification thereof. In one embodiment, the blockchain may be directly associated with the individual 104 such that the blockchain only includes transaction values for data transactions involving the individual 104. In such embodiments, the blockchain may have a unique identifier associated therewith that may be provided to the requesting entity 106 by the individual 104 (e.g., via a suitable input device). The individual 104 may supply the unique identifier, referred to herein as an entity identifier, to the requesting entity 106. The requesting entity 106 may then contact a node 112 of the blockchain network 110 and request the blockchain associated with the entity identifier. The node 112 may supply the corresponding blockchain to the requesting entity 106. The requesting entity 106 may then review the transaction values stored therein to obtain the previously verified transaction data associated with the individual 104. For instance, in the above example, the blockchain may include data related to the individual's prior employment experience, including verified information regarding each of the prior employers, the individual's position at each, the individual's salary at each, dates worked at each, etc.

In another embodiment, the blockchain may be configured to store data associated with data transactions involving a plurality of different entities. In such embodiments, the transaction values including data associated with data transactions involving the individual 104 may include an entity identifier associated with the individual 104. In some cases, the entity identifier may be a number, alphanumeric value, or other suitable value that may be used for identification. In other cases, the entity identifier may be an address that may be associated with a private key of a cryptographic key pair. In such cases, the private key may be used to generate digital signatures for transaction values that may be included in the blockchain for additional verification thereof. In these cases, the individual 104 may provide the public key corresponding to the private key to the requesting entity 106, which may be used by the requesting entity 106 to verify digital signatures stored in the blockchain to identify the transaction values associated with the individual 104. In other cases, the transaction values may be encrypted using a private key associated with the individual 104, which may be held by the individual 104 or the processing server 102 and used for encryption of the transaction values prior to inclusion in the blockchain. The private key may be a key in a key pair, where the corresponding public key is distributed to requesting entities 106. The requesting entity 106 may use the public key to decrypt the transaction values associated with the individual 104. In such cases, transaction values may also include an entity identifier, which may be unencrypted, which may also be supplied to the requesting entity 106 for easier identification of the applicable transaction values, which may then be decrypted using the public key.

The blockchain may thus be used to convey data to a requesting entity 106 that is previously verified and thus does not require additional verification and authentication by the requesting entity 106, and where the immutability of the blockchain may provide additional security regarding the integrity and accuracy of the data stored therein. The use of reference values in the blockchain provides for the immutability, as an attempt to falsify a transaction value can be detected as a transaction reference value generated for that block would yield a different result, which would in turn yield a different block reference value generated from that block's header, which would yield different block reference values for every subsequent block in the blockchain. As such, data stored in the blockchain cannot be modified, and any attempt to do so can be easily identified by identifying the first (e.g., by timestamp) block header where a generated transaction value and/or block reference value do not match the values stored therein.

As a result, the methods and systems discussed herein may provide for the secured and efficient storage of verified data via blockchain, which may be easily accessible by requesting entities 106 for easy distribution thereto without requiring an individual 104 to retain possession of their documents and in a manner that prevents falsification and tampering. As discussed in more detail below, the methods and systems discussed herein may be applicable for a variety of different industries and use cases where the system 100 may be specifically configured for the performing of functions related thereto.

Processing Server

Figure 2:
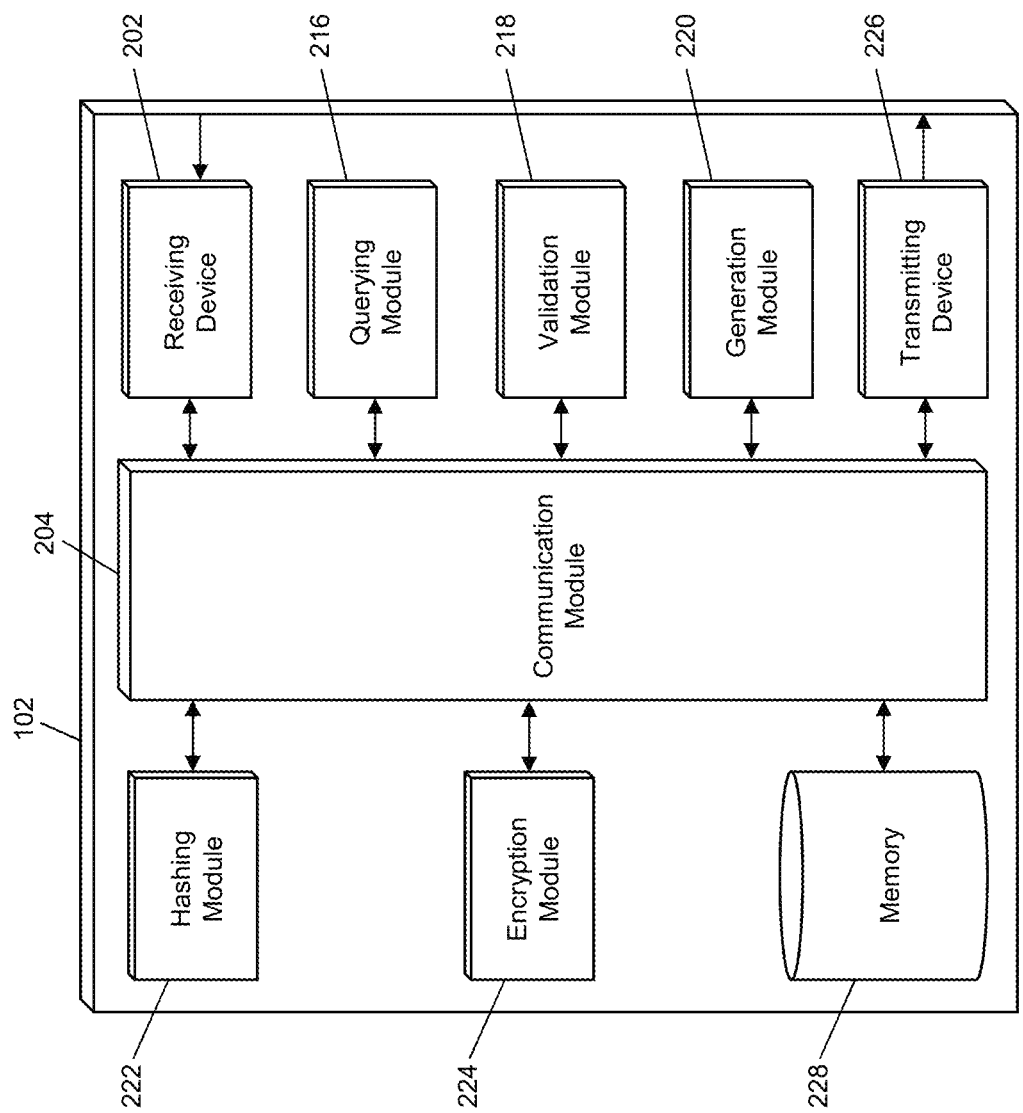
FIG. 2 is a block diagram illustrating the processing server of the system of FIG. 1 for the verification of data related to a data transaction and storage thereof via blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from individuals 104, requesting entities 106, transacting entities 108, nodes 112, verifying entities 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by individuals 104, transacting entities 108, and verifying entities 114, which may be superimposed or otherwise encoded with data associated with a data transaction. The data included therein may include at least an entity identifier and one or more data values associated with the data transaction. In some instances, the data may include a public key or private key associated with the entity identifier. The receiving device 202 may also be configured to receive data signals electronically transmitted by individuals 104, transacting entities 108, and verifying entities 114 that may be superimposed or otherwise encoded with confirmation notifications, which may confirm data values for a data transaction. The receiving device 202 may be further configured to receive data signals electronically transmitted by nodes 112, which may be superimposed or otherwise encoded with blockchain data, such as verified blocks or generated blocks for verification by the processing server 102. In some embodiments, the receiving device 202 may be configured to receive data signals electronically transmitted by requesting entities 106, which may be superimposed or otherwise encoded with an entity identifier for which blockchain data may be requested, such as in embodiments where the processing server 102 may be a node 112.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 216, validation module 218, generation module 220, hashing module 222, encryption module 224, etc. As used herein, the term "module" may be software executed by specifically configured hardware processors or hardware particularly programmed to receive an input, perform one or more processes using the input, and provides an output. The input, output, and processes performed by various modules will be apparent to one skilled in the art based upon the present disclosure.

The processing server 102 may include a querying module 216. The querying module 216 may be configured to execute queries on databases to identify information. The querying module 216 may receive one or more data values or query strings, and may execute a query string based thereon on an indicated database, such as a memory 228, to identify information stored therein. The querying module 216 may then output the identified information to an appropriate engine or module of the processing server 102 as necessary. The querying module 216 may, for example, execute a query on the memory 228 to identify blockchain data stored therein, such as to identify a blockchain associated with a supplied entity identifier, or to identify the block header of the block most recently added to the blockchain for use in generating a block reference value. In some cases, the querying module 216 may be configured to execute queries on the memory 228 to identify hashing algorithms, encryption keys, or other data for use in performing the functions discussed herein.

The processing server 102 may also include a validation module 218. The validation module 218 may be configured to validate (e.g., verify, authenticate, or otherwise confirm) data as part of the functions of the processing server 102 as discussed herein. The validation module 218 may receive data to be validated as input, may attempt to validate the data, and may output a result of the validation to another module or engine of the processing server 102. In some instances, the validation module 218 may receive additional data to be used for the validation as part of the input. In other instances, the validation module 218 may identify (e.g., by instructing the querying module 216 to execute queries on the appropriate memory 228) additional data to be used for the validation. The validation module 218 may be configured to validate data associated with a data transaction, such as by receiving confirmation of such data from another entity (e.g., the individual 104, transacting entity 108, verifying entity 114, etc.), or by receiving data values from such an entity that are then compared to data values received in a transaction notification to identify correspondence between the data. In embodiments where the processing server 102 may be a node 112, the validation module 218 may also be configured to validate reference values and to validate newly generated blocks using traditional methods for the validation of blocks in a blockchain.

The processing server 102 may also include a generation module 220. The generation module 220 may be configured to generate data for use in performing the functions of the processing server 102 as discussed herein. The generation module 220 may receive an instruction as input, may generate data as instructed, and may output the generated data to another module or engine of the processing server 102. For example, the generation module 220 may be configured to generate new block headers for inclusion in new blocks to the added to a blockchain, where a new block header includes at least a timestamp of the current time, a block reference value, and a transaction reference value. The generation module 220 may be configured to generate new blocks, which may include a block header and one or more transaction value associated therewith. In some embodiments, the generation module 220 may be configured to generate transaction values based on verified data, for inclusion in a blockchain.

The processing server 102 may include a hashing module 222. The hashing module 222 may be configured to apply hashing algorithms to data for the generation of hash values based thereon. The hashing module 222 may receive data to be hashed, may generate a hash value via application of one or more hashing algorithms to the data, and may output the generated hash value to another module or engine of the processing server 102. In some embodiments, the hashing module 222 may receive the hashing algorithm(s) or instructions for the selection thereof as part of the input. In other embodiments, the hashing module 22 may be configured to identify (e.g., via instructing of the querying module 216 to query a memory 228) the hashing algorithm(s) for use in generating the hash values as instructed. The hashing module 222 may be configured to generate block reference values via the application of one or more hashing algorithms to a block header. The hashing module 222 may also be configured to generate transaction reference values via the application of one or more hashing algorithms to transaction values, which may include the generation of a Merkle tree and the identification of a root of the Merkle tree as the transaction reference value.

In some embodiments, the processing server 102 may also include an encryption module 224. The encryption module 224 may be configured to perform encryption, decryption, and other cryptographic functions of the processing server 102 for performing the functions as discussed herein. The encryption module 224 may receive data and an instruction as input, may perform the appropriate cryptographic function, and may output any result to another module or engine of the processing server 102. In some instances, the encryption module 224 may receive keys, algorithms, or other data to be used in the performing of cryptographic functions. In other instances, the encryption module 224 may identify such data, such as via the providing of instructions to the querying module 216 to execute queries on the memory 228 for the identification thereof. The encryption module 224 may, for example, be configured to generate digital signatures using private keys, encrypt data values for a data transaction using a private key, decrypt encrypted data values using a public key, generate key pairs, etc.

The processing server 102 may also include a transmitting device 226. The transmitting device 226 may be configured to transmit data over one or more networks via one or more network protocols. In some instances, the transmitting device 226 may be configured to transmit data to individuals 104, requesting entities 106, transacting entities 108, nodes 112, verifying entities 114, and other entities via one or more communication methods, local area networks, wireless area networks, cellular communication, Bluetooth, radio frequency, the Internet, etc. In some embodiments, the transmitting device 226 may be comprised of multiple devices, such as different transmitting devices for transmitting data over different networks, such as a first transmitting device for transmitting data over a local area network and a second transmitting device for transmitting data via the Internet. The transmitting device 226 may electronically transmit data signals that have data superimposed that may be parsed by a receiving computing device. In some instances, the transmitting device 226 may include one or more modules for superimposing, encoding, or otherwise formatting data into data signals suitable for transmission.

The transmitting device 226 may be configured to electronically transmit data signals to individuals 104, transacting entities 108, and verifying entities 114 that are superimposed or otherwise encoded with data associated with data transactions for confirmation or with data for use in identification thereof, such as entity identifiers or other identifying information. The transmitting device 226 may also be configured to electronically transmit data signals to individuals 104, which may be superimposed with public keys and/or entity identifiers associated with the respective individual 104 for distribution to requesting entities 106 when associated data is requested. The transmitting device 226 may be configured to electronically transmit data signals to nodes 112 associated with a blockchain network 110, which may be superimposed or otherwise encoded with transaction values for data transactions or generated block headers and/or blocks for validation and inclusion in the associated blockchain. The transmitting device 226 may be further configured to electronically transmit data signals to requesting entities 106, which may be superimposed or otherwise encoded with blockchain data, such as may be identified based on a supplied entity identifier.

The processing server 102 may also include a memory 228. The memory 228 may be configured to store data for use by the processing server 102 in performing the functions discussed herein, such as public and private keys, symmetric keys, etc. The memory 228 may be configured to store data using suitable data formatting methods and schema and may be any suitable type of memory, such as read-only memory, random access memory, etc. The memory 228 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 228 may be comprised of or may otherwise include a relational database that utilizes structured query language for the storage, identification, modifying, updating, accessing, etc. of structured data sets stored therein.

The memory 228 may be configured to store blockchains, where a blockchain may be comprised of a plurality of blocks, each of which may include a block header and one or more transaction values for data transaction. The memory 228 may also be configured to store private keys for use in generating digital signatures based or encrypting data values included in transaction values added to a blockchain. The memory 228 may be further configured to store contact information and identification information for individuals 104, transacting entities 108, and verifying entities 114 for the identification thereof for use in performing the functions discussed herein.

First Process for Storing Verified Data via Blockchain

Figure 3:
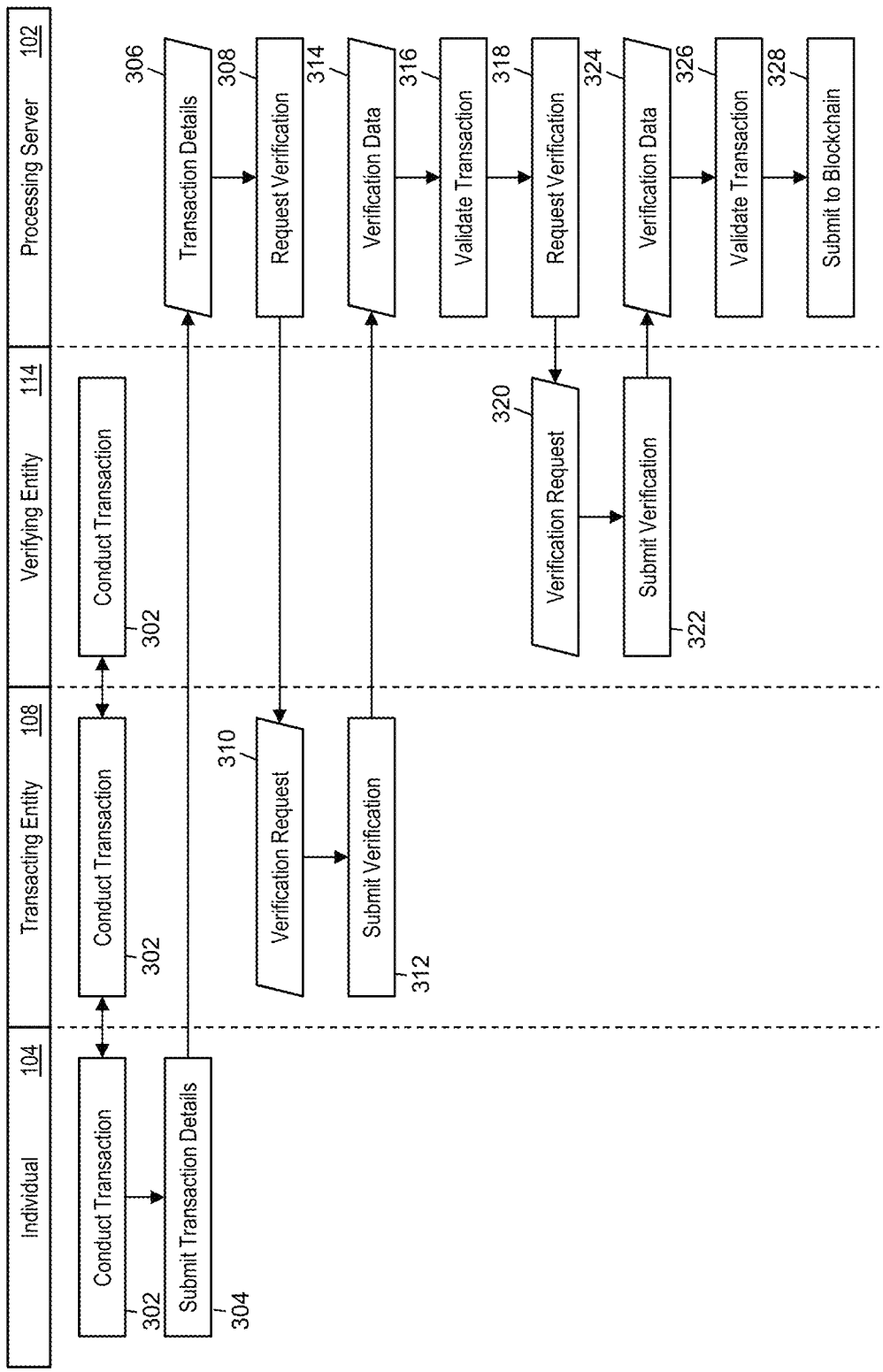
FIGS. 3 and 4 are flow diagrams illustrating processes for the verification and storage of data for a data transaction via blockchain in the system of FIG. 1 in accordance with exemplary embodiments.

FIG. 3 illustrates a first embodiment for a process for the verification of data associated with a data transaction and the storage thereof via a blockchain in the system 100.

In step 302, a data transaction may be conducted involving an individual 104 and a transacting entity 108, where a verifying entity 114 may be a party to or otherwise be provided evidence of the data transaction. In step 304, the individual 104 may electronically transmit transaction details for the data transaction to the processing server 102 using a suitable communication network and method, such as via an application programming interface associated with the processing server 102. In step 306, the receiving device 202 of the processing server 102 may receive the transaction details, which may be comprised of at least an entity identifier associated with the individual 104 and one or more data values associated with the data transaction.

In step 308, the transmitting device 226 of the processing server 102 may electronically transmit a data signal to the transacting entity 108 that is superimposed or otherwise encoded with a verification request, which may be received by the transacting entity 108, in step 310. The verification request may include at least the entity identifier associated with the individual 104. In some embodiments, the verification request may include the one or more data values included in the transaction details. In other embodiments, the verification request may include identifying information for use by the transacting entity 108 in identifying the data transaction. In step 312, the transacting entity 108 may identify data to submit in a verification notification, which may be electronically transmitted back to the processing server 102. In step 314, the receiving device 202 may receive the verification notification. In some embodiments, the verification notification may be a confirmation of the one or more data values. In other embodiments, the verification notification may include one or more data values as identified by the transacting entity 108 based on the identification data.

In step 316, the validation module 218 of the processing server 102 may validate the one or more data values supplied by the individual 104. Validation of the data values may include comparison of the one or more data values supplied by the individual 104 with the one or more data values supplied by the transacting entity 108 for correspondences therewith. In some cases, validation of the data values may include identifying that the transacting entity 108 submitted a suitable confirmation that confirms the one or more data values supplied by the individual 104.

In step 318, the transmitting device 226 of the processing server 102 may electronically transmit a data signal to the verifying entity 114 that is superimposed or otherwise encoded with a verification request, which may be received by the verifying entity in step 320. The verification request may include at least the entity identifier associated with the individual 104. In some embodiments, the verification request may include the one or more data values included in the transaction details. In other embodiments, the verification request may include identifying information for use by the verifying entity 114 in identifying the data transaction. In step 322, the verifying entity 114 may identify data to submit in a verification notification, which may be electronically transmitted back to the processing server 102. In step 324, the receiving device 202 may receive the verification notification. In some embodiments, the verification notification may be a confirmation of the one or more data values. In other embodiments, the verification notification may include one or more data values as identified by the verifying entity 114 based on the identification data.

In step 326, the validation module 218 of the processing server 102 may perform a second validation of the one or more data values supplied by the individual 104. The second validation may utilize the data supplied by the verifying entity 114, which may include identification of a suitable confirmation of the data values, or the receipt of data values that may be compared to the data values supplied by the individual 104 to identify correspondences between the data values. If the data values supplied by the individual 104 are positively verified, then, in step 328, the processing server 102 may submit the data values to the blockchain associated with the entity identifier for inclusion therein. In embodiments where the processing server 102 is a node 112, step 328 may include the generation of a block header and block that includes the data values in a transaction value included therein, which may then be electronically transmitted, by the transmitting device 226 of the processing server 102, to a node 112. In embodiments where the processing server 102 is not a node 112, step 328 may include the electronic transmission of the data values, or a transaction value that includes the data values, to a node 112 for inclusion in a block.

Second Process for Storing Verified Data via Blockchain

Figure 4:
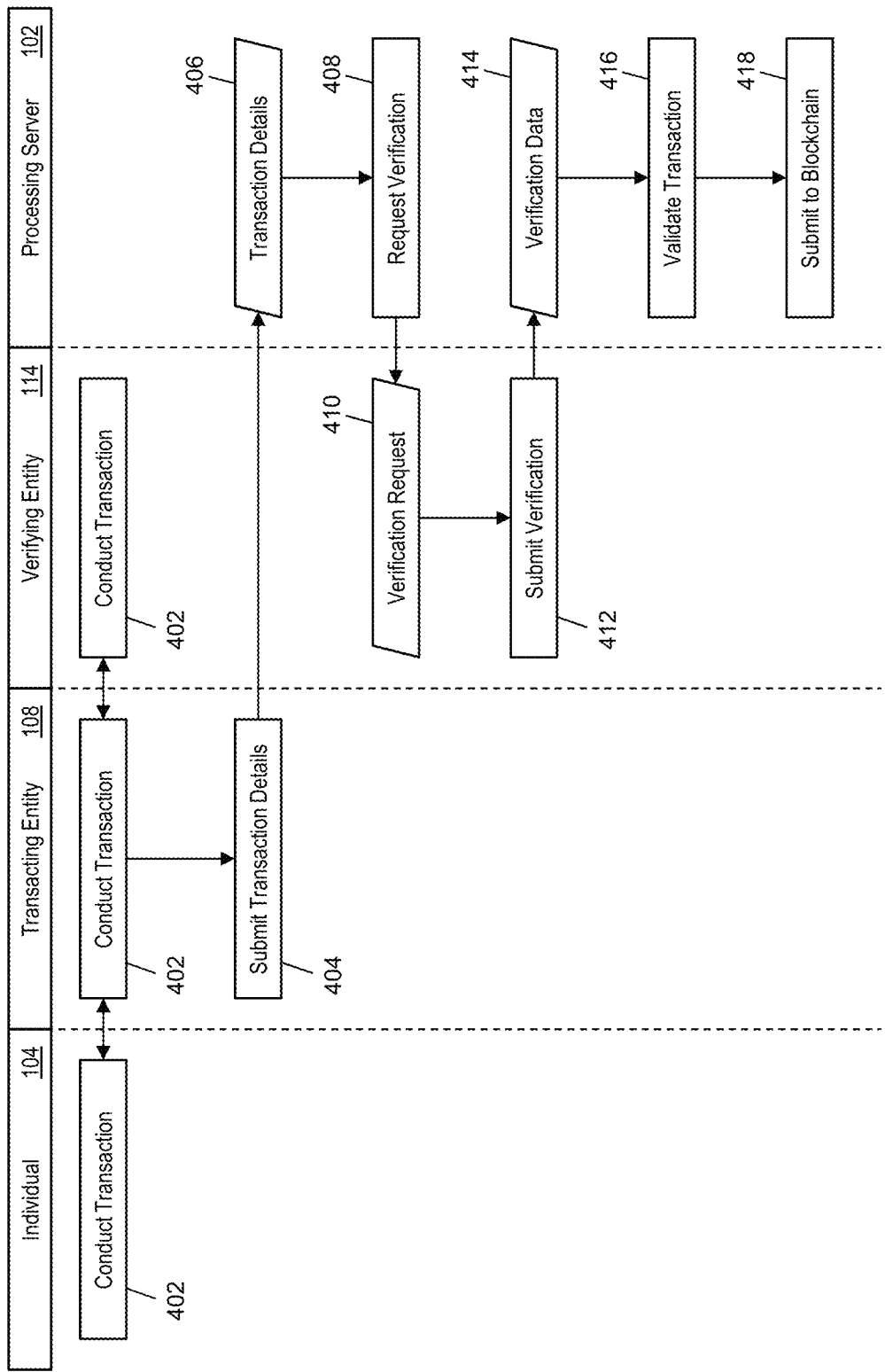

FIG. 4 illustrates a second embodiment for a process for the verification of data associated with a data transaction and the storage thereof via a blockchain in the system 100, where the data is supplied via a transacting entity 108.

In step 402, a data transaction may be conducted involving an individual 104 and a transacting entity 108, where a verifying entity 114 may be a party to or otherwise be provided evidence of the data transaction. In step 404, the transacting entity 108 involved in the data transaction may electronically transmit transaction details for the data transaction to the processing server 102 using a suitable communication network and method, such as via an application programming interface associated with the processing server 102. In step 406, the receiving device 202 of the processing server 102 may receive the transaction details, which may be comprised of at least an entity identifier associated with the individual 104 and one or more data values associated with the data transaction.

In step 408, the transmitting device 226 of the processing server 102 may electronically transmit a data signal to the verifying entity 114 that is superimposed or otherwise encoded with a verification request, which may be received by the verifying entity 114, in step 410. The verification request may include at least the entity identifier associated with the individual 104. In some embodiments, the verification request may include the one or more data values included in the transaction details. In other embodiments, the verification request may include identifying information for use by the verifying entity 114 in identifying the data transaction. In step 412, the verifying entity 114 may identify data to submit in a verification notification, which may be electronically transmitted back to the processing server 102. In step 414, the receiving device 202 may receive the verification notification. In some embodiments, the verification notification may be a confirmation of the one or more data values. In other embodiments, the verification notification may include one or more data values as identified by the verifying entity 114 based on the identification data.

In step 416, the validation module 218 of the processing server 102 may perform a validation of the one or more data values supplied by the transacting entity 108. The validation may utilize the data supplied by the verifying entity 114, which may include identification of a suitable confirmation of the data values, or the receipt of data values that may be compared to the data values supplied by the transacting entity 108 to identify correspondences between the data values. If the data values supplied by the transacting entity 108 are positively verified, then, in step 418, the processing server 102 may submit the data values to the blockchain associated with the entity identifier for inclusion therein. In embodiments where the processing server 102 is a node 112, step 418 may include the generation of a block header and block that includes the data values in a transaction value included therein, which may then be electronically transmitted, by the transmitting device 226 of the processing server 102, to a node 112. In embodiments where the processing server 102 is not a node 112, step 418 may include the electronic transmission of the data values, or a transaction value that includes the data values, to a node 112 for inclusion in a block.

Process for Identification and Retrieval of Verified Data via Blockchain

Figure 5:
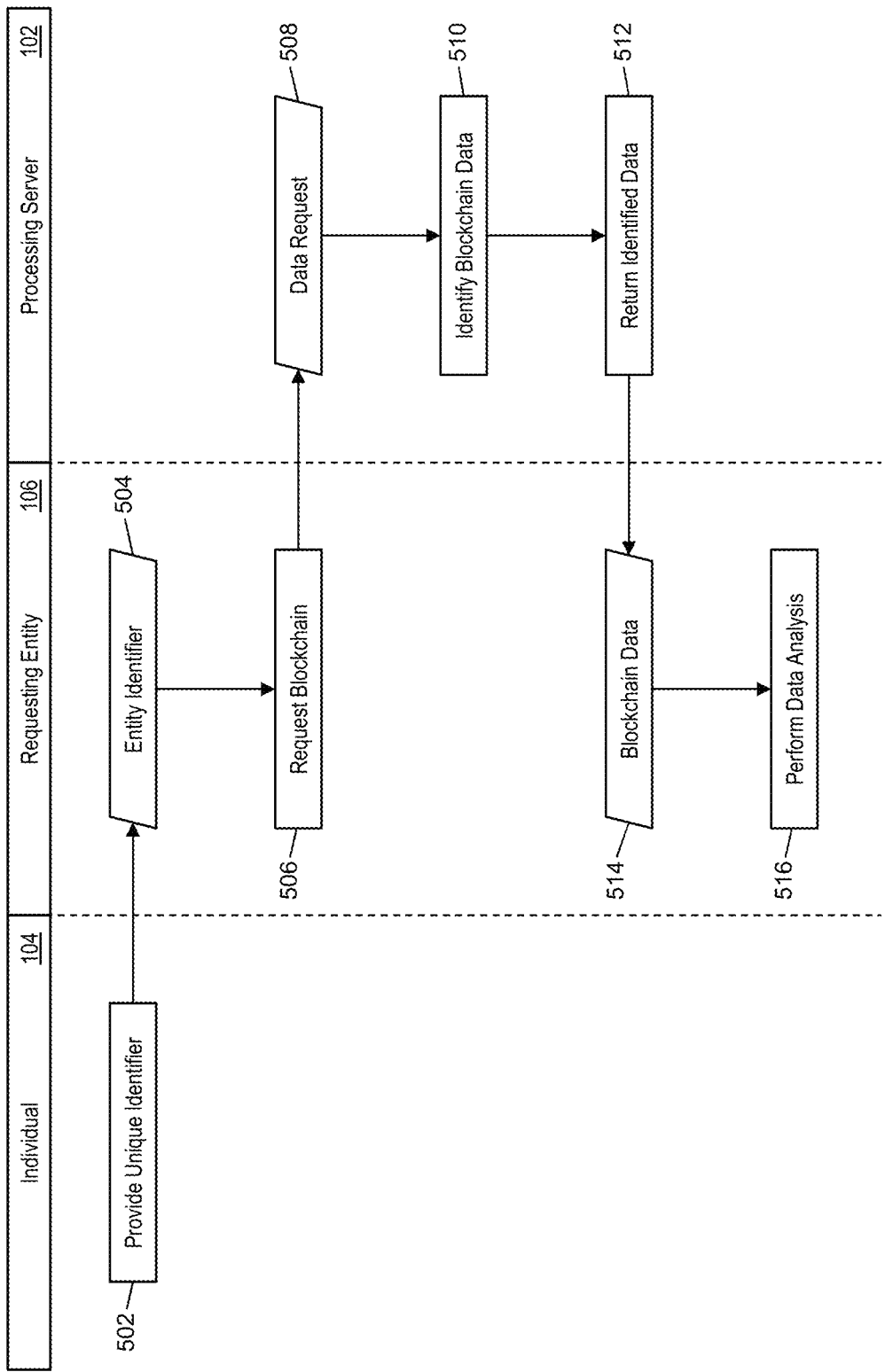
FIG. 5 is a flow diagram illustrating a process for the identification and retrieval of verified data stored via blockchain in the system of FIG. 1 in accordance with exemplary embodiments.

FIG. 5 illustrates a process for the retrieval of data via a blockchain and identification of verified data included therein that is associated with an individual 104 in the system 100.

In step 502, an individual 104 may provide a unique identifier (e.g., the entity identifier associated therewith) to a requesting entity 106 that requests data associated with data transactions involving the individual 104. In step 504, the requesting entity 106 may receive the entity identifier. In some embodiments, the individual 104 may also provide a public key to the requesting entity 106 that is associated with the individual 104 and used for the validation of digital signatures or the decryption of encrypted data. In step 506, the requesting entity 106 may electronically transmit a blockchain request to the processing server 102 as a node 112 of the blockchain network 110. The blockchain request may include at least the entity identifier received from the individual 104.

In step 508, the receiving device 202 of the processing server 102 may receive the data request including the entity identifier. In step 510, the querying module 216 of the processing server 102 may execute a query on the memory 228 of the processing server 102 to identify a blockchain associated with the individual 104. In one embodiment, the blockchain may be uniquely associated with the entity identifier. In another embodiment, the blockchain may include one or more transaction values including the entity identifier, but may also include additional transaction values including entity identifiers for other individuals 104. In step 512, the transmitting device 226 of the processing server 102 may electronically transmit the identified blockchain to the requesting entity 106.

In step 514, the requesting entity 106 may receive the blockchain data. In step 516, the requesting entity 106 may perform analysis on the data associated with the individual 104 as needed. In instances where the blockchain is uniquely associated with the individual 104, the analysis may be performed on all of the data values stored in the blockchain. In instances where the blockchain may include data values associated with others, the requesting entity 106 may identify data values included in the blockchain that include the entity identifier provided by the individual 104. In cases where the data values may be encrypted, the requesting entity 106 may decrypt the data values via a public key provided by the individual 104 in step 502.

Verification of Employment History

In some embodiments, the methods and systems discussed herein may be used for the storage and conveyance of an individual's employment history, such as for use by a potential employer, financial institution, governmental agency, or other entity in verifying an individual's past or present employment status.

In such an embodiment, the individual 104 may be an individual that has been employed by one or more entities. The individual 104 may be employed by an entity that may act as a transacting entity 108 in the system 100. The individual 104 or employer may submit data to the processing server 102 related to the individual's employment at the employer. Such data may include, for instance, the individual's name, job title, start date, salary, employee number, location, supervisor information, benefits, etc. The processing server 102 may verify this data with the other party (e.g., the employer if the data is submitted by the individual 104) and may seek verification from a verifying entity 114. In such embodiments, the verifying entity 114 may be, for example, a financial institution that is used for payment to the individual 104 from the employer or that receives payment from the employer on behalf of the individual 104, an agency that provides benefits to the individual 104 from the employer, a governmental agency that receives information from the employer regarding the individual's employment (e.g., a taxation agency).

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the employment status of the individual 104 changes. For instance, if the individual 104 is promoted to a new position at an employer, the individual 104 or employer may submit a new data transaction for posting to the blockchain that includes the updated information. Similarly, if the individual's employment at an employer is terminated, a new data transaction may be posted to the blockchain that includes, among other details, the date of termination of the employment.

In such an embodiment, the requesting entity 106 may be a potential new employer, a financial institution, or other entity interested in the individual's employment history. For example, as part of the application process for employment with a new employer, the individual 104 may provide the potential employer with their entity identifier. The requesting entity 106 may contact the processing server 102 or a node 112, as applicable, to retrieve the blockchain associated with the entity identifier. The requesting entity 106 may then review the transaction values stored in the blockchain to review the individual's employment history. The verification process used by the processing server 102 and immutability of the blockchain can ensure that the potential employer is reviewing an accurate and complete employment history for the individual 104 without any falsification or embellishment, so that the potential employer can be sure of the individual's past experiences.

Verification of Cross-Border Travel

In some embodiments, the methods and systems discussed herein may be used for the storage and conveyance of the history of an individual's cross-border travel, such as for use by a customs agency, immigration agency, financial institution, or other entity in verifying the individual's movement between countries.

In such an embodiment, the individual 104 may be an individual that has traveled from at least one country to another. The individual 104 may travel from one country to another, where the transacting entity 108 may be an immigration agency receiving the individual 104 in another country, an airline or other travel institution that transports the individual 104 to the other country, or other suitable entity. The individual 104 or the immigration agency (e.g., or other entity, as applicable) may submit data to the processing server 102 related to the individual's travel from one country to another. Such data may include, for instance, the departing country, the arrival country, the travel date, the travel method, flight numbers, times, visa status, immigration status, visit reason, etc. The processing server 102 may verify this data with the other party (e.g., the immigration agency if the data is submitted by the individual 104) and may seek verification from a verifying entity 114. In such embodiments, the verifying entity 114 may be, for example, an airline used for travel if the transacting entity 108 is an immigration agency, a financial institution that issues a transaction account to the individual 104 used in the new country, a customs agency that receives the individual 104 in the new country, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 travels in or out of a country. For instance, the individual 104 may travel from one country to another for a business meeting, where a first entry may be posted for their travel into the other country for the meeting, and a second entry posted for their travel back to the first country.

In such an embodiment, the requesting entity 106 may be, for example, a state department processing a visa application for the individual 104. For instance, as part of the application process for a visa to visit the country in which the state department exists, the individual 104 may provide the state department with their entity identifier. The state department may contact the processing server 102 or a node 112, as applicable, to retrieve the blockchain associated with the entity identifier. The state department may then review the transaction values stored in the blockchain to review the individual's history of cross-border travel. The verification process used by the processing server 102 and immutability of the blockchain can ensure that the state department is reviewing an accurate and complete travel history for the individual 104 without any falsification or embellishment, so that the state department can be assured of the individual's movements in and out of other countries. In another example, an immigration agency may use such data for faster processing of visitors or returning residents to the country.

Indexing of History of Life Events

In some embodiments, the methods and systems discussed herein may be used for the storage and conveyance of the history of life events for an individual 104, such as for use by a governmental agency, financial institution, or other entity in verifying an individual's identity or other statuses related to their life events.

In such an embodiment, the individual 104 may have a history of life events, one or more of which may be relied upon by other entities for various functions. Such life events may include, for example, their birth, high school graduation, college graduation, marriage, having children, divorce, etc. The individual 104 may experience a life event where a transacting entity 108 may be a participant or otherwise associated with the life event for verification thereof. For example, the individual 104 may get married, where the transacting entity 108 may be the officiant of the ceremony. The individual 104 or the officiant (e.g., or other entity, as applicable) may submit data to the processing server 102 related to the individual's marriage. The data submitted to the processing server 102 may vary based on the life event. For example, a marriage may include the spouse's name, wedding date, venue, officiant name, etc., whereas the birth of a child may include the mother's name, father's name, birthplace, facility where the birth took place, child's name, child's weight, child's size, etc. The processing server 102 may verify the received data with the other party (e.g., the officiant if the data is submitted by the individual 104) and may seek verification from a verifying entity 114. In such embodiments, the verifying entity 114 may be an entity that receives proof or can otherwise verify the life event. For instance, if the life event is a marriage, the local municipality that receives the marriage certificate may be the verifying entity 114, whereas if the life event is a high school graduation, the verifying entity 114 may be an official that witnessed the conferring of their diploma.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 experiences a life event. For instance, the individual 104 may get divorced, buy a house, get married, and have a child, each of which may have corresponding data transactions posted to the blockchain.

In such an embodiment, the requesting entity 106 may be, for example, a government agency processing an application for benefits submitted by the individual 104. For instance, as part of the application process for social security, an associated government agency may need to verify the individual's marital status and number of dependents, and may request the entity identifier from the individual 104. The agency may contact the processing server 102 or a node 112, as applicable, to retrieve the blockchain associated with the entity identifier. The agency may then review the transaction values stored in the blockchain to review the individual's life events, specifically the marriage, divorce, and child birth events. The verification process used by the processing server 102 and immutability of the blockchain can ensure that the agency is reviewing an accurate and complete history of life events for the individual 104 without any falsification or embellishment, so that the agency can be assured of the individual's martial and familial status to provide the proper benefits. In another example, a municipality may use the data to ensure that the individual 104 has not been married, or is legally divorced, before issuing a marriage certificate to the individual 104.

Record of Medical History

In some embodiments, the methods and systems discussed herein may be used for the storage and conveyance of an individual's medical history, such as for use by a doctor, medical provider, or insurance provider in providing care or benefits to the individual 104.

In such an embodiment, the individual 104 may be an individual that has experienced one or more medical events. The individual 104 may experience a medical event, such as a doctor's visit, a surgery, the prescribing of medication, a physical, etc., where the transacting entity 108 may be a doctor, medical institution, health provider, insurance provider, pharmacy, or other suitable entity. The individual 104 or the other entity may submit data to the processing server 102 related to the individual's medical history for a medical event. Such data may include, for instance, a type of event, health status, doctor's name, course of treatment, prescribed medications, indicated allergies, etc. The processing server 102 may verify this data with the other party (e.g., a medical provider if the data is submitted by the individual 104) and may seek verification from a verifying entity 114. In such embodiments, the verifying entity 114 may be, for example, an insurance agency that pays for the medical event, a pharmacy that supplies prescribed medication to the individual 104, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 experiences a medical event. For instance, the individual 104 may visit a doctor for a physical, be prescribed medication, and return for a follow-up, where new transactions may be posted to the blockchain for each of the initial physical, the fulfillment of the prescription, and the follow-up visit.

In such an embodiment, the requesting entity 106 may be, for example, a new doctor providing care to the individual 104. For instance, as part of the intake process for the individual 104 at the new doctor, the individual 104 may provide the doctor with their entity identifier. The doctor may contact the processing server 102 or a node 112, as applicable, to retrieve the blockchain associated with the entity identifier. The doctor may then review the transaction values stored in the blockchain to review the individual's medical event history, such as to be apprised of the individual's allergies, current medications, family history, etc. The verification process used by the processing server 102 and immutability of the blockchain can ensure that the doctor is reviewing an accurate and complete travel history for the individual 104 without any falsification or embellishment, so that the doctor can be assured of the individual's medical history for providing treatment thereto. In another example, an insurance provider may utilize the data when determining what medical costs can or should be covered based on the individual's medical history.

Index of Driving Records

In some embodiments, the methods and systems discussed herein may be used for the storage and conveyance of an individual's driving record, such as for use by an insurance provider, automobile retailer, licensing agency, etc.

In such an embodiment, the individual 104 may be an individual that has been issued or is applying for a driving license in a municipality. The individual 104 may be issued a driving license, receive a ticket, or experience another event that affects their driving record, where the transacting entity 108 may be a department of motor vehicles, law enforcement agency, vehicle mechanic, or other suitable entity. The individual 104 or the law enforcement agency (e.g., or other entity, as applicable) may submit data to the processing server 102 related to the individual's driving record, such as the issuing of a citation to the individual 104. Such data may include, for instance, date of licensing, type of license, issuing authority, citation number, type of citation, penalty of citation, court date, jurisdiction, vehicle identification number, license number, etc. The processing server 102 may verify this data with the other party (e.g., the law enforcement agency if the data is submitted by the individual 104) and may seek verification from a verifying entity 114. In such embodiments, the verifying entity 114 may be, for example, the municipality in which a citation is issued, the court that receives a citation bearing a court date for the individual 104, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 experiences an event having an effect on their driving record. For instance, the individual 104 may receive a citation and may then attend a court date where the citation is withdrawn or served by the individual 104, where an entry may be added for the issuing of the citation and another for the settlement thereof.

In such an embodiment, the requesting entity 106 may be, for example, an insurance provider being requested to provide automobile insurance the individual 104. For instance, as part of the application process for insurance, the individual 104 may provide the insurance provider with their entity identifier. The insurance provider may contact the processing server 102 or a node 112, as applicable, to retrieve the blockchain associated with the entity identifier. The insurance provider may then review the transaction values stored in the blockchain to review the individual's driving record. The verification process used by the processing server 102 and immutability of the blockchain can ensure that the insurance provider is reviewing an accurate and complete driving record for the individual 104 without any falsification or embellishment, so that the insurance provider can be assured of the individual's driving record, such as to determine a level of coverage and associated fees. In another example, an automobile accessories manufacturer may provide discounts to individuals 104 based on their driving record, and may review associated blockchain data accordingly.

User Session Validation

In some embodiments, the methods and systems discussed herein may be used for the storage and conveyance of data related to an authenticated user session in an ecosystem, such as for use by devices and systems in that ecosystem in verifying that an individual (e.g., via a computing device associated therewith) has already been successfully authenticated.

In such an embodiment, the individual 104 may be an individual that has been (e.g., via a computing device associated therewith, such as a desktop computer, laptop computer, notebook computer, tablet computer, cellular phone, smart phone, smart watch, wearable computing device, implantable computing device, etc.) authenticated in a computing ecosystem using a suitable authentication process. The individual 104 may be authenticated by a device or computing system in the ecosystem, where the transacting entity 108 may be the device or system that performed the authentication. The individual 104 or the device (e.g., or other entity, as applicable) may submit data to the processing server 102 related to the successful authentication. Such data may include, for instance, a device identifier for the individual's device, the individual's username or other authentication details, a start date or time of the session, an identifier of the device or system that performed the authentication, a session expiration time, etc. The processing server 102 may verify this data with the other party (e.g., the authenticating device if the data is submitted by the individual 104) and may seek verification from a verifying entity 114. In such embodiments, the verifying entity 114 may be, for example, a server or other device in the ecosystem that is used in authentication, such as may store login credentials that are used by the authenticating device.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 is authenticated in the computing ecosystem. For instance, in some cases the individual's authentication may be refreshed as the individual 104 continues to perform actions in the ecosystem, effectively resetting the expiration time for the session. In such cases, the blockchain may be updated with a new post each time the session is refreshed, or may wait to update the blockchain until the last refreshing action occurs prior to expiration of an earlier session.

In such an embodiment, the requesting entity 106 may be, for example, a second device in the computing ecosystem that needs to authenticate the individual 104. For instance, as part of the connection process to the individual's computing device, the second device may acquire the entity identifier from the individual's device. The second device may contact the processing server 102 or a node 112, as applicable, to retrieve the blockchain associated with the entity identifier. The second device may then review the transaction values stored in the blockchain to review details of the individual's sessions. The verification process used by the processing server 102 and immutability of the blockchain can ensure that the second device is reviewing an accurate and complete session history for the individual 104 without any falsification or embellishment, such that if there is a valid user session in which the individual 104 has already been authenticated, the second device may accept the individual 104 as the authenticated user without requiring the individual 104 to repeat the authentication process, easing the individual's interaction with the ecosystem without sacrificing security.

Indexing of Charitable Donations

In some embodiments, the methods and systems discussed herein may be used for the storage and conveyance of a history of an individual's charitable donations, such as for use by a the individual, a taxation agency, financial institution, or other entity in verifying the individual's charitable donations.

In such an embodiment, the individual 104 may be an individual that has made a charitable or other type of donation for which an accurate accounting is beneficial. The individual 104 may provide a charitable donation to a third party, where the transacting entity 108 may be the third party that receives the charitable donation or another suitable entity. The individual 104 or the third party (e.g., or other entity, as applicable) may submit data to the processing server 102 related to the individual's charitable donation. Such data may include, for instance, the value of the donation, type of donation, an accounting of donated items, time and/or date of donation, location of donation, source of the donation, etc. The processing server 102 may verify this data with the other party (e.g., the third party if the data is submitted by the individual 104) and may seek verification from a verifying entity 114. In such embodiments, the verifying entity 114 may be, for example, a financial institution issuing the transaction account used to donate, an auditing agency, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 makes a charitable donation. For instance, the individual 104 may donate money, goods, and services to a third party, such as helping pay for, provide baked goods for, and work at a baked goods sale provided by the third party. In such an instance, a single transaction value may encompass the entire donation, or a separate transaction may be posted for each of the monetary donation, donation of goods, and donation of service.

In such an embodiment, the requesting entity 106 may be, for example, a taxation agency that is identifying potential tax write-offs for the individual 104. For instance, as part of the auditing process for accounts of the individual 104, the individual 104 may provide the agency with their entity identifier. The agency may contact the processing server 102 or a node 112, as applicable, to retrieve the blockchain associated with the entity identifier. The agency may then review the transaction values stored in the blockchain to review the individual's history of charitable donations. The verification process used by the processing server 102 and immutability of the blockchain can ensure that the agency is reviewing an accurate and complete indexing of charitable donations for the individual 104 without any falsification or embellishment, so that the agency can be assured of the value of the individual's charitable donations. In another example, an entity may provide benefits to individuals 104 based on charitable donations, and may use the blockchain to verify that such donations were actually made. In yet another example, the donation information on the blockchain can assist in automatically validating a charitable organization's statements and mission, or its efficiency, by comparing donations the organization has received with the location and amount of the organization's spend, such as on disaster relief, etc.

Management of Information Technology Resources

In some embodiments, the methods and systems discussed herein may be used for the storage and conveyance of data related to information technology resources, such as for use by different departments or companies that share information technology resources in the tracking and usage thereof.

In such an embodiment, an information technology resource may take place of the individual 104 in the system 100. The resource may be any technology resource that may need to be tracked, audited, or otherwise managed, such as a database, computing device, hardware resource, bandwidth allocation, operating system, internet protocol address, communication port, etc., where the transacting entity 108 may be a user or system that allocates, uses, or otherwise interacts with the information technology resource. The resource or the user (e.g., or other entity, as applicable) may submit data to the processing server 102 related to the allocation or other usage of the information technology resource. Such data may include, for instance, identification data of the resource, type of allocation, reason for allocation, start and end times for allocation, access permissions, etc. The processing server 102 may verify this data with the other party (e.g., the user if the data is submitted by the resource) and may seek verification from a verifying entity 114. In such embodiments, the verifying entity 114 may be, for example, a different user or resource that can verify allocation or other interaction with the resource, such as a server that can verify that a specific port of a router (e.g., as the resource) has been forwarded to that server, etc.

Once verified, the processing server 102 may add the data to a blockchain that is uniquely associated with the resource, or to a blockchain associated with multiple resources with the data being accompanied by an entity identifier or other value unique to the resource. Such a process may be repeated any time the status of the resource is changed, such as its allocation or access. For instance, an internet protocol address may be assigned to a first device for a period of time, and then changed to a second device, where both assignments may be reflected by posts in the blockchain.

In such an embodiment, the requesting entity 106 may be, for example, user or device in a computing system that wants to use or otherwise manage an information technology resource. For instance, a user may want to reassign an internet protocol address, and may identify the entity identifier associated therewith (e.g., in a lookup table used by the information technology department). The user may contact the processing server 102 or a node 112, as applicable, to retrieve the blockchain associated with the entity identifier. The user may then review the transaction values stored in the blockchain to review the assignment history of the internet protocol address, such as to identify if it is currently assigned and, if so, when such an assignment expires or if a new address may need to be assigned to the current device. The verification process used by the processing server 102 and immutability of the blockchain can ensure that the user is reviewing an accurate and complete history for the resource without any falsification or embellishment, so that the user can properly utilize the resource and ensure consistent operation of the system. In another example, a user may want to use a server to perform an intensive computing operation, and may use the blockchain to identify if the resources are suitable for usage.

Business to Business Transaction Tracking and Management

In some embodiments, the methods and systems discussed herein may be used for the storage and conveyance of data related to business to business transactions, such as for use by businesses, financial institutions, taxation agencies, auditing agencies, or other entities in verifying transactions involving a business.

In such an embodiment, the individual 104 may be a business that participates in business to business transactions. The business may participate in payment transactions with other businesses, where the transacting entity 108 may be another business that is transacting with the primary business (e.g., as the individual 104). The primary business (e.g., or other entity, as applicable) may submit data to the processing server 102 related to the business to business transaction. Such data may include, for instance, a transaction time, transaction date, geographic location, invoice number, purchase order number, good or service details, transaction amount, account information, payee and/or payer information, etc. The processing server 102 may verify this data with the other party (e.g., the other business if the data is submitted by the primary business) and may seek verification from a verifying entity 114. In such embodiments, the verifying entity 114 may be, for example, an issuing financial institution issuing the transaction account used for payment in the transaction, an acquiring financial institution issuing the transaction account used to receive payment, a shipping provider making delivery of purchase goods, etc.

Once verified, the processing server 102 may add the data to a blockchain that is uniquely associated with the primary business, or to a blockchain associated with multiple businesses with the data being accompanied by an entity identifier or other value unique to the primary business. Such a process may be repeated any time the primary business participates in a payment transaction. In some cases, a transaction may be posted multiple times, based on stages of the transaction, such as a first post for the initial processing of the transaction, a second post for fulfillment of the transacted-for goods or services, and a third post for successful payment of the transaction balance.

In such an embodiment, the requesting entity 106 may be, for example, a lending institution seeking to provide a loan to the primary business. For instance, as part of the application process for a loan from the lending institution, the primary business may provide the lending institution with their entity identifier. The lending institution may contact the processing server 102 or a node 112, as applicable, to retrieve the blockchain associated with the entity identifier. The lending institution may then review the transaction values stored in the blockchain to review the primary business's business to business transaction history. The verification process used by the processing server 102 and immutability of the blockchain can ensure that the lending institution is reviewing an accurate and complete transaction history for the primary business without any falsification or embellishment, so that the lending institution can be assured of the primary business's dealings and financial outlook. In another example, an auditing agency may use the blockchain data to audit the primary business's accounting, using the immutable transaction record as needed.

Monitoring of Financial Health

In some embodiments, the methods and systems discussed herein may be used for the storage and conveyance of data related to an individual's financial health, such as for use by financial institutions, lending institutions, governmental agencies, credit bureaus, etc. in providing goods or services to an individual 104 based thereon.

In such an embodiment, the individual 104 may be an individual that has participated in payment transactions and other transactions that may affect the individual's financial health, including their credit rating, earning potential, etc. The individual 104 may participate in a transaction affecting their financial health, where the transacting entity 108 may be a party to such a transaction, such as the lending institution that provides a mortgage to the individual 104, a bank that issues a line of credit to the individual 104, a utility that is routinely paid by the individual 104, etc. The individual 104 or the other entity may submit data to the processing server 102 related to the transaction. Such data may include, for instance, a transaction or lending amount, credit amount, repayment amount, interest rate, issuance date, repayment date, terms and conditions, etc. The processing server 102 may verify this data with the other party (e.g., a financial institution if the data is submitted by the individual 104) and may seek verification from a verifying entity 114. In such embodiments, the verifying entity 114 may be, for example, a transaction processor that processes transactions for a payment instrument issued by a financial institution to the individual 104, an agency with which a lien or mortgage is registered, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 performs an action that affects their financial health. For instance, when a mortgage is provided to an individual 104 for purchasing a house, a corresponding transaction may be posted to the blockchain. In some cases, each repayment made by the individual 104 on the mortgage may be posted to the blockchain, as each repayment may affect the balance of the mortgage as well illustrate the individual's ability to manage the payments.

In such an embodiment, the requesting entity 106 may be, for example, a credit bureau determining a credit score for the individual 104. For instance, as part of the scoring process, the individual 104 may provide the credit bureau with their entity identifier. The credit bureau may contact the processing server 102 or a node 112, as applicable, to retrieve the blockchain associated with the entity identifier. The credit bureau may then review the transaction values stored in the blockchain to review the individual's financial health. The verification process used by the processing server 102 and immutability of the blockchain can ensure that the credit bureau is reviewing an accurate and complete financial health record for the individual 104 without any falsification or embellishment, so that the credit bureau can be assured of the individual's actions for determining their credit score. In another example, a financial institution may use the blockchain data to determine a credit limit to be extended to the individual 104.

Management of Financial Assets

In some embodiments, the methods and systems discussed herein may be used for the storage and conveyance of data related to an individual's financial assets, such as stocks, mutual fund shares, bonds, etc., such as for use by the individual 104 in accounting, governmental agencies in identifying taxes or fees, etc.

In such an embodiment, the individual 104 may be an individual that owns financial assets. The individual 104 may purchase or otherwise receive a financial asset, where the transacting entity 108 may be a financial institution, corporation, lender, or other suitable entity. The individual 104 or the financial institution (e.g., or other entity, as applicable) may submit data to the processing server 102 related to the individual's securing of a financial asset, such as the purchasing of stock. Such data may include, for instance, purchase time and/or date, purchase cost, asset type, asset value, associated entity data, fund details, asset or fund proportion, etc. The processing server 102 may verify this data with the other party (e.g., the financial institution if the data is submitted by the individual 104) and may seek verification from a verifying entity 114. In such embodiments, the verifying entity 114 may be, for example, a trading platform used for the purchase of stock, a management institution that manages a mutual fund contributed to by the individual 104, the company that issued stock purchased by the individual 104, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 purchases a financial asset or ownership of an asset changes. For instance, a corporation in which the individual 104 owns stock may split the stock, resulting in a change to the number of shares possessed by the individual 104, for which a new post may be made on the blockchain to reflect the change in the number of shares.

In such an embodiment, the requesting entity 106 may be, for example, a governmental agency auditing the financial assets of the individual 104. For instance, as part of the auditing process, the individual 104 may provide the governmental agency with their entity identifier. The governmental agency may contact the processing server 102 or a node 112, as applicable, to retrieve the blockchain associated with the entity identifier. The governmental agency may then review the transaction values stored in the blockchain to review the individual's financial assets. The verification process used by the processing server 102 and immutability of the blockchain can ensure that the governmental agency is reviewing an accurate and complete portfolio of financial assets for the individual 104 without any falsification or embellishment, so that the governmental agency can be assured of the individual's financial assets. In another example, a lending institution may review the blockchain data to determine the individual's net worth.

Life Cycle Management

In some embodiments, the methods and systems discussed herein may be used for the storage and conveyance of data related life cycle management for certificates and keys, such as for use by a business or other entity for management and validation thereof.

In such an embodiment, the individual 104 may be a business or other entity that issues certificates or keys, such as public or private keys of key pairs for use in performing various cryptographic functions. The individual 104 may issue a security certificate, where the transacting entity 108 may be an entity that receives the certificate. The individual 104 or the entity may submit data to the processing server 102 related to the issued certificate. Such data may include, for instance, certificate data, standards data, protocols data, issuance dates, expiration dates, etc. The processing server 102 may verify this data with the other party (e.g., the recipient entity if the data is submitted by the individual 104) and may seek verification from a verifying entity 114. In such embodiments, the verifying entity 114 may be, for example, a standards agency associated with the certificate, a third party verification service, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time a certificate is issued to a new entity or the status thereof changes. For instance, a security certificate may be issued to a plurality of different entities, where each time the certificate is issued a new transaction value is posted to the blockchain accordingly.

In such an embodiment, the requesting entity 106 may be, for example, an entity that wants to verify the validity of a security certificate. For instance, as part of the verification, the entity may receive the entity identifier from the individual 104 or another entity. The entity may contact the processing server 102 or a node 112, as applicable, to retrieve the blockchain associated with the entity identifier. The entity may then review the transaction values stored in the blockchain to review the history of the security certificate. The verification process used by the processing server 102 and immutability of the blockchain can ensure that the entity is reviewing an accurate and complete history for the security certificate without any falsification or embellishment, so that the entity can be assured that a security certificate, public key, or private key, is valid.

Software Release Cycle Management

In some embodiments, the methods and systems discussed herein may be used for the storage and conveyance of the history and management of the release cycle of software, such as for use by a related entity for management and auditing of software.

In such an embodiment, a software program or other application may be used as the individual 104 in the system 100, and may be an application program that is distributed to one or more entities and goes through different versions. The application program may be patch, upgraded, or otherwise modified, where the transacting entity 108 may be the development entity. The development entity may submit data to the processing server 102 related to the application program. Such data may include, for instance, the version number, change log, program data, update date, etc. The processing server 102 may verify this data with the other party (e.g., the application program, such as by checking its version in the program data) and may seek verification from a verifying entity 114. In such embodiments, the verifying entity 114 may be, for example, a publishing platform, etc.

Once verified, the processing server 102 may add the data to a blockchain that is uniquely associated with the individual 104, or to a blockchain associated with multiple individuals 104 with the data being accompanied by an entity identifier or other value unique to the application program. Such a process may be repeated any time the application program is updated or otherwise changed. For instance, each time a new version of the application program is published or distributed, the blockchain may be updated accordingly.

In such an embodiment, the requesting entity 106 may be, for example, an entity auditing a version of the application program. For instance, as part of the auditing process, the entity may identify the entity identifier associated with the application program, such as may be included in its program code or by contacting the development entity. The entity may contact the processing server 102 or a node 112, as applicable, to retrieve the blockchain associated with the entity identifier. The entity may then review the transaction values stored in the blockchain to review the history of the application program, such as to identify changes made subsequent to or before the version being used. The verification process used by the processing server 102 and immutability of the blockchain can ensure that the entity is reviewing an accurate and complete history of the release cycle of the application program without any falsification or embellishment, so that the entity can be assured of the history and status of the application program. In another example, the blockchain data may be used to perform reversions to prior versions of the application program, such as due to incompatibility issues, where the blockchain provides assurance as to the authenticity of the program code.

Real Property Transactional History

In some embodiments, the methods and systems discussed herein may be used for the storage and conveyance of the history of real property, such as for use by a governmental agency, potential purchaser, property manager, etc.

In such an embodiment, a parcel of real property may take the place of the individual 104 in the system 100, such that data associated with the parcel of real property and transactions involving the real property may be stored in the blockchain. The real property may be involved in a plurality of different transactions, where the transacting entity 108 may be a buyer or seller, contractor, state assessor, home owners association, etc. An authorized representative of the real property or the transacting entity 108 may submit data to the processing server 102 related to the transaction involving the real property. Such data may include, for instance, parcel identifier, owner data, address, school district, municipality, emergency services data, lot size, building type, building size, tenant data, number of rooms, building age, applicable association data, improvement time, improvement type, approval documents, etc. The processing server 102 may verify this data with the other party (e.g., a contractor performing work on the real property if the data is submitted by the individual 104) and may seek verification from a verifying entity 114. In such embodiments, the verifying entity 114 may be, for example, a building inspector that inspects work being performed, a financial institution verifying repayment of a lien, a municipality that receives deed records, etc.

Once verified, the processing server 102 may add the data to a blockchain that is uniquely associated with the real property, or to a blockchain associated with multiple properties with the data being accompanied by an entity identifier or other value unique to the real property. Such a process may be repeated any time the real property is involved in a data transaction. For instance, work may be performed on the real property for which a lien is issued until paid for. In such an instance, the blockchain may be updated with transactions for the work being performed, the lien, the payment of the work, and withdrawal of the lien.

In such an embodiment, the requesting entity 106 may be, for example, a potential buyer. For instance, when looking to buy the real property as a new home, the potential buyer may obtain the entity identifier associated therewith, such as from the owner or a selling agent. The potential buyer may contact the processing server 102 or a node 112, as applicable, to retrieve the blockchain associated with the entity identifier. The potential buyer may then review the transaction values stored in the blockchain to review the history of the real property, such as to ensure they are being provided correct information and be aware of all work performed on the property. The verification process used by the processing server 102 and immutability of the blockchain can ensure that the potential buyer is reviewing an accurate and complete travel history for the individual 104 without any falsification or embellishment, so that the property buyer can be assured regarding the details of the property. In another example, a contractor being sought to do work on a house may review the blockchain data to identify details regarding prior work done, such as for identification of materials or other useful data.

Indexing of Personal Property Records

In some embodiments, the methods and systems discussed herein may be used for the storage and conveyance of data related to an individual's personal property, such as for use by an insurance provider, executor, the individual themselves, or other entity in evaluating the individual's personal property.

In such an embodiment, the individual 104 may be an individual that owns one or more pieces of personal property, such as vehicles, furniture, electronics, appliances, clothing, equipment, livestock, etc. The individual 104 may purchase or sell personal property, where the transacting entity 108 may be the entity that sells the personal property to the individual 104, the entity that buys the personal property from the individual, or other suitable entity. The individual 104 or the seller (e.g., or other entity, as applicable) may submit data to the processing server 102 related to the transaction involving the individual's personal property. Such data may include, for instance, property name, property value, property size, property location, acquiring date, selling date, seller name, buyer name, identification number, etc. The processing server 102 may verify this data with the other party (e.g., the buyer or seller if the data is submitted by the individual 104) and may seek verification from a verifying entity 114. In such embodiments, the verifying entity 114 may be, for example, a service used to facilitate the transaction, a manufacturer of the property through which it is registered, an insurance provider that insures the property, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 buys, sells, or otherwise modifies their personal property. For instance, the individual 104 may replace the appliances in their house, where the blockchain may be updated with transactions involving the sale or disposal of the old appliances as well as transactions involving the purchase and install of the new appliances.

In such an embodiment, the requesting entity 106 may be, for example, an insurance provider seeking to insure the individual's personal property. For instance, as part of the application process for insurance, the individual 104 may provide the insurance provider with their entity identifier. The insurance provider may contact the processing server 102 or a node 112, as applicable, to retrieve the blockchain associated with the entity identifier. The insurance provider may then review the transaction values stored in the blockchain to review the individual's personal property, such as to evaluate the value thereof. The verification process used by the processing server 102 and immutability of the blockchain can ensure that the insurance provider is reviewing an accurate and complete accounting of the individual's personal property without any falsification or embellishment, so that the insurance provider can be assured of the individual's current personal property and the value thereof. In another example, a potential buyer may review the blockchain data to identify the individual's ownership of personal property before purchasing.

Verification of Personal Identity

In some embodiments, the methods and systems discussed herein may be used for the storage and conveyance of the data verifying an individual's identity, such as for use by a financial institution, law enforcement agency, or other entity that needs to verify the individual's identity.

In such an embodiment, the individual 104 may be any individual whose identify may need to be verified by a third party. The individual 104 may submit data for addition to the blockchain that may be used in verifying their identity, where the transacting entity 108 may be an entity associated with identification of the individual 104, such as a licensing agency that issues a driving license to the individual 104, a financial institution that issues a transaction account to the individual 104, a law enforcement agency that runs a background check on the individual 104, etc. The individual 104 or the licensing agency (e.g., or other entity, as applicable) may submit data to the processing server 102 related to the individual's identity. Such data may include, for instance, name, address, demographic characteristics, physical characteristics, transaction account numbers, license numbers, utility account numbers, etc. The processing server 102 may verify this data with the other party (e.g., the licensing agency if the data is submitted by the individual 104) and may seek verification from a verifying entity 114. In such embodiments, the verifying entity 114 may be, for example, a financial institution from which the individual 104 is requesting a withdrawal from a transaction account, a law enforcement agency attempting to identify the individual 104 during an investigation, etc.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 receives new identifying information or updates to existing information. For instance, the blockchain may be updated when the individual 104 is issued a driving license, and then again any time the address on the license is changed or the license is renewed.

In such an embodiment, the requesting entity 106 may be, for example, a financial institution identifying the individual 104 for withdrawal from a transaction account. For instance, as part of the withdrawal process, the individual 104 may provide the financial institution with their entity identifier. The financial institution may contact the processing server 102 or a node 112, as applicable, to retrieve the blockchain associated with the entity identifier. The financial institution may then review the transaction values stored in the blockchain to review the individual's identification information, such as to ensure the license data included therein matches a license presented by the individual 104. The verification process used by the processing server 102 and immutability of the blockchain can ensure that the financial institution is reviewing an accurate and complete record of the individual's identity without any falsification or embellishment, so that the financial institution can be assured of the individual's identity before processing the withdrawal. In another example, a restaurant may use the blockchain to verify the individual's identity, and therefore age, before serving alcoholic substances to the individual 104.

Universal Loyalty Card

In some embodiments, the methods and systems discussed herein may be used for the storage and conveyance of data associated with a loyalty card for an individual, such as one that may operate as a universal loyalty card across a plurality of different merchants, that can be verified for use and redemption by involved merchants and other entities.

In such an embodiment, the individual 104 may be any individual that may possess a loyalty card for use at one or more merchants, particularly a universal loyalty card that may earn and redeem points with one of a plurality of different merchants. The individual 104 may participate in a payment transaction at a merchant that may qualify for the earning of points (e.g., or other loyalty currency or value) or for the redemption of points, where the transacting entity 108 may be the merchant involved in the payment transaction, or a related entity, such as an acquiring financial institution, third party payment processor, etc. The merchant may submit data to the processing server 102 related to the individual's loyalty card. Such data may include, for instance, loyalty card number, name, address, zip code, postal code, telephone number, username, loyalty program type, etc. The processing server 102 may verify this data with the other party (e.g., the individual 104 if the data is submitted by the merchant) and may seek verification from a verifying entity 114. In such embodiments, the verifying entity 114 may be, for example, a third party loyalty program provider, another merchant that utilizes the loyalty program, the issuing financial institution associated with the transaction account used by the individual 104 to fund the payment transaction, the merchant's acquiring financial institution, etc.

Once verified, the processing server 102 may add the data to a blockchain that is uniquely associated with the loyalty card being used, or to a blockchain associated with multiple loyalty cards with the data being accompanied by an entity identifier or other value unique to the specific loyalty card and/or individual 104. Such a process may be repeated any time the individual 104 participates in a new payment transaction that is either a transaction eligible for earning points or one in which the individual 104 is redeeming points. For instance, the blockchain may be updated when the individual 104 purchases gas that is eligible for a certain redemption value, and then updated again when the individual 104 uses their loyalty points to purchase movie tickets.

In such an embodiment, the requesting entity 106 may be, for example, a merchant at which the individual 104 is attempting to redeem their loyalty points. For instance, as part of the payment transaction process, the individual 104 may provide the merchant with an entity identifier associated with their universal loyalty card, such as a loyalty card number. The merchant (e.g., or an entity acting on behalf of the merchant, such as a loyalty program provider or an acquiring financial institution) may contact the processing server 102 or a node 112, as applicable, to retrieve the blockchain associated with the entity identifier. The merchant may then review the transaction values stored in the blockchain to review the associated loyalty account information, such as the current point balance, to ensure that the individual 104 has sufficient points for the desired redemption. The verification process used by the processing server 102 and immutability of the blockchain can ensure that the merchant is reviewing an accurate and complete record of the status of the loyalty account without any falsification or embellishment, so that the merchant can be assured of the individual's available point balance prior to processing the redemption.

Tracking of Perishable Goods

In some embodiments, the methods and systems discussed herein may be used for the storage and conveyance of data associated with perishable goods. For instance, the creation and expiration of perishable goods may be tracked via the blockchain to prevent fraud with respect to the sale of perishable goods.

In such an embodiment, the individual 104 may be any individual that desires verification of a perishable good, such as a perishable food product, such as meat, eggs, milk, etc. In these embodiments, a transacting entity 108 may be an entity involved in the creation, packaging, transport, or other handling of a perishable good, such as a butcher, meat packer, transportation service, grocer, etc. The transacting entity 108 may submit data associated with a perishable good to the blockchain, which may be used by the individual 104 in verifying the authenticity and expiration of the perishable good. Such data may include, for instance, the date of creation of the perishable good, transportation conditions, transportation times, storage locations, estimated expiration date, etc. The processing server 102 may verify this data received from the transacting entity 108 with a verifying entity 114. In such embodiments, the verifying entity 114 may be, for example, another transacting entity 108 (e.g., the grocer verifying date of delivery from a transportation service, an inspection agency verifying date of creation and product quality, etc.).

Once verified, the processing server 102 may add the data to a blockchain that is uniquely associated with the perishable good, or to a blockchain associated with multiple perishable goods with the data being accompanied by an entity identifier or other value unique to the perishable good. For example, the packaging of the perishable good may include a machine-readable code, such as a bar code or quick response (QR) code that is encoded with the entity identifier, where the individual 104 may use a mobile computing device to read the entity identifier to retrieve the corresponding data from the blockchain. Such a process may be repeated any time the status of the perishable good changes, such as it being transported to a new location or its storage conditions change. For instance, the blockchain may be updated when the perishable good is picked up by a transportation service, updated again when the transportation service delivers the good to its final destination at a grocer, and then updated once again when the grocer makes the good available for sale.

In such an embodiment, the requesting entity 106 may be, for example, the individual 104. For instance, as part of the process for verifying the perishable good, the individual 104 may contact the processing server 102 or a node 112, as applicable, to retrieve the blockchain associated with the entity identifier corresponding to the perishable good (e.g., read from the package). The individual 104 may then review the information associated with the perishable good, such as to verify that the expiration date listed on the package is accurate and has not been tampered with or fraudulently adjusted. The verification process used by the processing server 102 and immutability of the blockchain can ensure that the individual 104 is reviewing an accurate and complete record of the perishable good without any falsification or embellishment, so that the individual 104 can be assured of the good's quality and freshness. In another example, a restaurant may use the blockchain to verify the quality of goods received from a supplier before use in preparing food for sale.

Verification of Cash Reserves

In some embodiments, the methods and systems discussed herein may be used for the storage and conveyance of data regarding the cash reserves of a financial institution or other entity, such as may be used by financial regulators, auditors, governmental agencies, credit bureaus, etc.

In such an embodiment, the individual 104 may be a financial institution or other entity, including a person, whose cash reserves may be tracked via storage in the blockchain for review by other, external entities. The cash reserves may be cash that is either kept on hand physically or is otherwise available to the entity at any given time. The financial institution may submit data to the blockchain regarding deposits made with the financial institution as well as payments made from the financial institution, to operate as an accounting to keep track of the value of cash reserves of the financial institution. Such data may include, for instance, transaction times, transaction amounts, interest rates, etc. The processing server 102 may verify this data with the other party (e.g., the individual 104 or other entity making the deposit or receiving payment, such as a withdrawal, from the financial institution) and may seek verification from a verifying entity 114. In such embodiments, the verifying entity 114 may be, for example, another financial institution receiving payment or from where a deposit is made (e.g., the individual's bank), a payment processor that processes a monetary transfer, an auditing service, etc.

Once verified, the processing server 102 may add the data to a blockchain that is uniquely associated with the financial institution, or to a blockchain associated with multiple financial institutions with the data being accompanied by an entity identifier or other value unique to the financial institution. Such a process may be repeated any time cash reserves of the financial institution are accessed and/or modified. For instance, an individual 104 may make a deposit with the financial institution, and the corresponding data uploaded to the blockchain. A requesting entity 106, such as a governmental agency performing an audit, may request the blockchain associated with the financial institution's cash reserves, and may evaluate the data stored therein to determine the cash reserves of the financial institution at or near real-time, as it would include the latest deposit as made by the individual 104. The verification process used by the processing server 102 and immutability of the blockchain can ensure that the requesting entity 106 is looking at the most up to date and accurate representation of the financial institution's cash reserves, ensuring that the financial institution cannot misrepresent their position. In another example, a loan provider wishing to evaluate an individual's assets may use the blockchain to verify the individual's position based on their cash reserves as indicated in the blockchain.

Multi-Party Bill Settlement

In some embodiments, the methods and systems discussed herein may be used to accommodate for the settlement of a bill across multiple parties, specifically the ability for multiple individuals to contribute to payment of a single bill, such as splitting the check at a restaurant.

In such an embodiment, a group of individuals 104 may participate in a single payment transaction for which multiple individuals 104 want to pay. For example, the group of individuals 104 may be part of a single party at a restaurant and may want to split the bill, such as by an equal split among each individual 104 or by each individual 104 contributing in proportion to the cost of their order. One of the individuals 104 may submit data to the blockchain regarding payment of the bill. In some cases, an individual 104 may submit the total amount of the bill and each of the portions to be paid by the respective individuals 104. In other cases, the individual 104 may submit the total amount and only the portion they intend to pay. The processing server 102 may verify this data with the other individuals 104 in the party (e.g., by requesting verification thereby, or based on submissions from each of the other individuals 104 with their intended payment amounts) and may seek verification from a verifying entity 114. In such embodiments, the verifying entity 114 may be, for example, the merchant to whom the bill is due, such as the restaurant where the group is eating, that may be able to verify the total amount of the bill.

Once verified, the processing server 102 may add the data to a blockchain that is uniquely associated with the particular bill, or to a blockchain associated with multiple bills with the data being accompanied by an entity identifier or other value unique to the specific transaction. Such a process may be repeated for submissions by each of the individuals 104 in the group, until the total bill amount is accounted for. A requesting entity 106, such as an issuing financial institution associated with the transaction account used by one of the individuals 104 to fund their payment, may request the blockchain data to verify that a payment is to be made to the respective merchant. The verification process used by the processing server 102 and immutability of the blockchain can ensure that the requesting entity 106 is looking at an accurate accounting of the amount due by their customer and to whom the payment is to be made, to prevent fraud and ensure accuracy of payment. In addition, the merchant may operate as a requesting entity 106, to ensure that the entire bill is being covered based on the submitted payment amounts.

Verification and Validation of Insurance Claims

In some embodiments, the methods and systems discussed herein may be used to validate and verify insurance claims and to prevent the submission and honoring of fraudulent insurance claims.

In such an embodiment, an individual 104 may own a vehicle, house, or other property on which insurance may be provided. The individual 104 may purchase or otherwise receive the insurance coverage from an insuring institution, such as an insurance company. When any event occurs for which an insurance claim may be made, the individual 104 or another involved entity may submit data associated therewith to the blockchain. For instance, in an automobile accident, the individual 104 may submit the data, or it may be submitted by another involved individual, a first responder, a witness, etc. The processing server 102 may verify this data with other involved individuals or entities (e.g., first responders) and may seek verification from a verifying entity 114. In such embodiments, the verifying entity 114 may be, for example, the insurance company with which the involved property is insured, which may verify the property and it being involved in an incident.

Once verified, the processing server 102 may add the data to a blockchain that is uniquely associated with the insured property, or to a blockchain associated with multiple properties with the data being accompanied by an entity identifier or other value unique to the specific insured property. A requesting entity 106, such as the insurance company covering someone else or other property involved in the accident (e.g., in an automobile accident, the other driver's insurance company), may request the blockchain data to verify information about the incident. In another example, the individual's insurance company may request the blockchain data to review first responder reports and other data to verify that a claim made by the individual 104 is genuine, such as to prevent fraud. The verification process used by the processing server 102 and immutability of the blockchain can ensure that the requesting entity 106 is looking at accurate and genuine data, to prevent fraud and ensure accuracy of claims. In addition, insurance companies may submit data regarding the processing of claims, such as to indicate if claims are found to be fraudulent, which may be used by other insurance companies later on to identify patterns of fraud behavior and identify troublesome individuals 104.

Monitoring of Government Spending

In some embodiments, the methods and systems discussed herein may be used to store data related to government spending, which may be used in the auditing thereof and monitoring by taxpayers and other interested parties.

In such an embodiment, the individual may be a government or subset of a government, such as a government agency. The government may receive money from taxpayers and other sources that are to be used in any manner of projects, as set forth by budgets and other information that is known to the public. When spending is made as part of a project, the government may submit data associated therewith to the blockchain. For instance, a department of transportation may begin a project to widen a roadway, and may submit data regarding advancement of the project (e.g., timelines, estimates, progress reports, pictures, etc.) as well as information regarding spending, such as transactions for the purchase of materials, labor, etc. The processing server 102 may verify this data with other involved individuals or entities (e.g., recipients of payments, materials vendors, etc.) and may seek verification from a verifying entity 114. In such embodiments, the verifying entity 114 may be, for example, another governmental agency or trusted party that can verify the spending being performed. In some cases, the recipient of funds or supplier may be considered a verifying entity 114.

Once verified, the processing server 102 may add the data to a blockchain that is uniquely associated with the project, or to a blockchain associated with multiple projects with the data being accompanied by a project identifier or other value unique to the specific project. For instance, the blockchain may be a single blockchain of all of the projects of a particular governmental agency. A requesting entity 106, such as a taxpayer curious as to how the government is spending their tax dollars or an auditing organization, may request the blockchain data from the processing server 102 to review the data about the project. The verification process used by the processing server 102 and immutability of the blockchain can ensure that the requesting entity 106 is looking at accurate and genuine data, to prevent fraud and ensure accuracy of the spending. The taxpayer or other entity may then see precisely how the government is spending, which may help hold the government accountable to prevent overspending and misuse of funds. In addition, the public availability of such information may encourage more competitive offerings to the government for procuring contracts and the like, as well as facilitate public assistance on government projects that may be unavailable otherwise.

Usage and Verification of Service-Level Agreements

In some embodiments, the methods and systems discussed herein may be used to store data related to service-level agreements (SLAs) between service providers and their customers, which may be verified by either party via the blockchain and later relied on in the event of disagreements.

In such an embodiment, the individual 104 may be the recipient of services provided by a service provider as part of a SLA between the service provider and the recipient. For instance, the service provider may be an Internet service provider that provides Internet service to the individual 104, a small business, or other entity as pursuant to a SLA between both entities. When the SLA is agreed upon, the individual 104 or the service provider may submit the data associated with the SLA to the blockchain to be added thereto. Such data may include, for instance, all of the terms and conditions of the SLA, payments made as part of the SLA, services details, updates to the agreement, etc. The processing server 102 may verify this data with the other entity (e.g., the individual 104 if the data is submitted by the service provider) and may seek verification from a verifying entity 114. In such embodiments, the verifying entity 114 may be, for example, an inspector, an auditor, a landlord, a property manager, or any other entity that may be able to independently verify one or more aspects of the SLA.

Once verified, the processing server 102 may add the data to a blockchain that is uniquely associated with the SLA, or to a blockchain associated with multiple SLAs with the data being accompanied by an entity identifier or other value unique to the specific SLA, the individual 104, and/or the service provider. A requesting entity 106 may request the blockchain data from the processing server 102 to review the data about the SLA. For example, a dispute may arise between the individual 104 and the service provider, which may end up in court. The SLA data stored on the blockchain may be called upon as part of the court proceedings by any entity acting as a requesting entity 106 in this instance, such as the attorneys for one or both sides. The verification process used by the processing server 102 and immutability of the blockchain can ensure that the data retrieved by the requesting entity 106 is accurate and genuine and has not been tampered with or adjusted, such as to prevent unauthorized modification to the agreement or prove non-payment or payment of funds.

Accounting of Personal Commodities

In some embodiments, the methods and systems discussed herein may be used to store data related to personal commodities, particularly commodities that may be used by others, such as through renting, borrowing, or other suitable mechanisms.

In such an embodiment, the individual 104 may be an individual that owns or otherwise has control of a personal commodity that may be made available to others for use, such as via renting or other mechanism. The personal commodity may be, for example, a set of golf clubs, a vehicle, machinery, tools, a computing device, etc. The individual 104 may make the commodity available to others through a suitable platform that may utilize the blockchain network 110 to store data associated with the commodity and the sharing thereof. The processing server 102 may be configured to verify the commodity that is being submitted by the individual 104 for sharing via the use of a verifying entity 114, which may be another person wishing to share the commodity or other suitable entity, such as a third party vendor hired for verification, the entity that sold the commodity to the individual 104, a financial institution that issued the account used by the individual 104 to fund a transaction for purchase of the commodity, or other entity that may be dependent on the type of commodity (e.g., a department of motor vehicles for vehicles as commodities).

Once the commodity is verified, the processing server 102 may add data to the blockchain that is associated with the personal commodity of the individual 104. In some embodiments, a single blockchain may be associated with the individual 104 where each entry may be associated with personal commodities of the individual 104 and the sharing and use thereof. In other embodiments, each blockchain may be associated with a single commodity. In still other embodiments, a single blockchain may be used for all personal commodities, or all commodities of a specified type (e.g., all vehicles, all golf kits, all tools, etc.), where each entry may specify (e.g., via a unique identification value) the commodity to which it relates. The processing server 102 may add a new entry to the blockchain each time the commodity is modified by the individual 104 or rented, borrowed, or otherwise interacted with by a third party, such as a transacting entity 108. The transacting entity 108, such as another individual requesting use of a personal commodity, may request the blockchain associated with the commodity or that otherwise contains entries related to the commodity, to view details of the commodity, such as, for a vehicle, make and model information, vehicle identification number, mileage information, etc. The transacting entity 108 may receive the personal commodity from the individual 104, where the possession or use of the transacting entity 108 may be logged with the blockchain network 110 via the transacting entity 108, individual 104, or processing server 102. The verification process used by the verifying entity 114 may provide the transacting entity 108 with assurance that the commodity they are obtaining is genuine, while the blockchain may provide for an accurate and immutable accounting of the use thereof to provide extra peace of mind for the individual 104.

Verification of Academic Credentials

In some embodiments, the methods and systems discussed herein may be used for the storage and conveyance of data regarding the academic or other similar type of credentials, such as may be used by educational institutions, potential employers, financial institutions, etc.

In such an embodiment, the individual 104 may be a person, whose academic credentials may be stored in the blockchain for use and verification by another entity, such as a potential employer wanting to ensure that the individual 104 received the education they present on their résumé. The academic credentials may be a transcript, conferring of a degree, bar certification, research paper, or other similar information that may be desired by a potential employer or other similar entity. The individual 104 or the educational institution that issued the academic credentials to the individual 104 may submit the data to the processing server 102, where the processing server 102 may verify this data with the other party. For instance, the individual 104 may submit that they were conferred a degree by a university, where the processing server 102 may request verification from the university as the verifying entity 114 that the university did in fact confer the degree on the individual 104. The verifying entity 114 may thus be the university or any other entity that may be able to verify credentials presented by the individual 104 (e.g., a journal publishing a paper written by the individual 104, a third party transcript provider, a testing board, etc.).

Once verified, the processing server 102 may add the data to a blockchain that is uniquely associated with the individual 104, or to a blockchain associated with multiple individuals with the data being accompanied by identification data associated with the individual 104, such as a name, tax identification number, username, telephone number, etc. Such a process may be repeated for other credentials that the individual 104 may want to store on the blockchain, which may be presented to a third party. For instance, the individual 104 may submit their résumé to a potential employer, which may state that the individual 104 has received two degrees from two different educational institutions as well as various certifications. The potential employer may thus be a requesting entity 106, which may request the blockchain data associated with the individual 104, and may evaluate the data to ensure that the individual 104 did in fact receive the degrees and certifications purported. The verification process used by the processing server 102 and immutability of the blockchain can ensure that the requesting entity 106 is looking at genuine and accurate data of the individual 104, which may reduce, if not eliminate, the potential for fraudulent presentation of credentials. In another example, an individual 104 may be able to prove their identity to a requesting entity 106 by providing identification data illustrating that they are the individual 104 associated with data stored in the blockchain, such as to prove that they are the author of a publication where data associated with the publication is stored in the blockchain as the academic credentials.

Verification of Corporate Credit Score

In some embodiments, the methods and systems discussed herein may be used for the storage and conveyance of data regarding the financial health of an individual or business entity, particularly with respect to data that may be used to identify the credit worthiness of a large corporate entity.

In such an embodiment, the individual 104 may be a corporate entity that may be engaging in financial transactions or other credit-based activities with other entities, where the financial behavior of the corporate entity and credit worthiness thereof may be of interest to other, external entities. The corporate entity or other institutions having interacts with the corporate entity that may be of interested to the other, external entities may submit data to the blockchain regarding the financial health and credit worthiness of the corporate entity. Such data may include, for instance, extended lines of credit, uses of credit, transactions that affect credit worthiness or financial health, credit ratings of the corporate entity, corporate structuring changes, stock issuance, sale, or split data, etc. The processing server 102 may verify this data with the other party (e.g., the corporate entity to whom credit was extended, a purchase of stock in the corporate entity, etc.) and may seek verification from a verifying entity 114. The verifying entity 114 may be, for example, another financial institution receiving payment via the corporate entity's line of credit, the exchange on which shares of the corporate entity were bought or sold, etc.

Once verified, the processing server 102 may add the data to a blockchain that is uniquely associated with the corporate entity, or to a blockchain associated with multiple entities with the data being accompanied by an entity identifier or other value unique to the corporate entity. Such a process may be repeated any time an action is performed that may affect the financial health or credit worthiness of the corporate entity. For example, any time a new line of credit is extended to the corporate entity or an existing line of credit is modified, such data may be added to the blockchain. A requesting entity 106, such as a credit rating agency, financial institution, governmental agency performing an audit, etc., may request the blockchain associated with the corporate entity's financial health, and may evaluate the data stored therein accordingly. For example, a financial institution approached by the corporate entity for a new line of credit may evaluate the blockchain data associated with the corporate entity to determine the size of the line of credit to be offered to the corporate entity. The verification process used by the processing server 102 and immutability of the blockchain can ensure that the requesting entity 106 is looking at the most up to date and accurate representation of the corporate entity's financial health and credit worthiness, ensuring that the corporate entity cannot misrepresent their position. In another example, a rating agency may use the blockchain data to evaluate the corporate entity's financial health for providing a rating of the corporate entity that may be used by third parties wishing to interact with the corporate entity.

Tracking of Post-Purchase Behavior

In some embodiments, the methods and systems discussed herein may be used to track the behavior of a consumer following the completion of an initial payment transaction, such as with relation to returns, chargebacks, or other post-transaction activity related to the initial payment transaction.

In such an embodiment, the individual 104 may be a person or entity that may engage in a payment transaction that may be funded by the individual 104 or another entity associated therewith, where the individual 104 may receive goods or services as part of the processed payment transaction. Any time an action is performed by the individual 104 following the completion of the initial payment transaction that is related to that initial payment transaction, such data may be submitted to the blockchain, to operate as an accounting to keep track of the behavior of the individual 104 following a transaction. Such data may include, for instance, the existence of a return or chargeback for the transaction and data related thereto, such as time of the return or chargeback, amount refunded in the return or chargeback, products exchanged or charged back, location of the return (e.g., if at a different physical location of the merchant), etc. The processing server 102 may verify this data with the other party (e.g., the individual 104 that participated in the transaction or the merchant or financial institution with which the transaction was returned or charged back, respectively, and may seek verification from a verifying entity 114. In such embodiments, the verifying entity 114 may be, for example, the financial institution through which a refund was processed, or the merchant to whom the chargeback is enforced. For example, the individual 104 may seek a refund from the merchant as the transacting entity 108, where the merchant may provide the refund to the individual 104, with the individual's financial institution operating as the verifying entity 114 to verify that the refund was, in fact, issued.

Once verified, the processing server 102 may add the data to a blockchain that is uniquely associated with the individual 104, or to a blockchain associated with multiple individuals 104 with the data being accompanied by an entity identifier or other value unique to the individual 104. Such a process may be repeated any time the individual 104 engages in a new payment transaction, or may, in some cases, only be repeated if post-transaction behavior occurs. For instance, in one case, the blockchain may store data related to all transactions involving the individual 104, while, in another case, the blockchain may only include data for transactions that were later refunded or charged back. A requesting entity 106, such as a financial institution or merchant wanting to do business with the individual 104, may request the blockchain data associated with the individual 104, and may evaluate the data to identify the nature of post-purchase behavior by the individual 104, frequency of such actions, etc. The verification process used by the processing server 102 and immutability of the blockchain can ensure that the requesting entity 106 is looking at the most up to date and accurate representation of the individual's post-purchase behavior, ensuring that the individual 104 cannot misrepresent their behavior, providing the requesting entity 106 with data that may be beneficial for avoiding fraud or honoring requests by the individual 104 with sufficient care. In another example, a merchant of luxury goods may decide to not sell an expensive item to the individual 104 if the merchant discovers a history for the individual 104 rife with charge backs initiated for various luxury goods.

Management of a Frequent Flyer Program

In some embodiments, the methods and systems discussed herein may be used for the storage and conveyance of data regard frequent flyer miles or other similar reward points that may be associated with multiple redeemers, such as for a frequent flyer program used by an alliance of airlines, where the miles may be redeemed at each of the airlines that are a part of the alliance.

In such an embodiment, the individual 104 may be a person or other entity (e.g., a company or partnership) that may receive frequent flyer miles for various actions, such as through traveling, use of a partnered payment card, etc. Data regarding the earning and usage of frequency flyer miles may be submitted to the blockchain for storage thereon, which may thus operate as an accounting of the current status of the individual 104 with respect to their frequent flyer miles. Such data may include a current balance, how miles were spent, how miles were earned, details regarding usage of miles, details regarding earning of miles, program eligibilities of the individual 104, etc. The processing server 102 may verify this data with the other party (e.g., the individual 104 that earned or used miles) and may then seek verification through a verifying entity 114. In such embodiments, the verifying entity 114 may be with whom miles were later redeemed, the merchant involved in a transaction for which miles were earned, etc. For example, the individual 104 may use a branded card at a merchant that may enable the individual 104 to earn extra miles, where the card processor may be the transacting entity 108 and the merchant with whom the transaction took place the verifying entity 104.

Once verified, the processing server 102 may add the data to a blockchain that is uniquely associated with the individual 104, or to a blockchain associated with multiple individuals with the data being accompanied by a unique identifier that is unique to the individual 104. Such a process may be repeated any time miles are earned or spent or otherwise modified (e.g., such as modification to the rules or rate at which miles may be earned or used by the individual 104). For example, the individual 104 may participate in a transaction with a branded card, where the earning of miles based thereon may be uploaded to the blockchain. A requesting entity 106, such as an airline with which the individual 104 wants to redeem their miles, may request the blockchain associated with the individual 104, and may evaluate the data stored therein to ensure that the individual 104 has the miles they are attempting to use. The verification process used by the processing server 102 and immutability of the blockchain can ensure that the requesting entity 106 is looking at the most up to date and accurate accounting of an individual's miles, ensuring that the individual 104 cannot defraud the airline or another entity. In another example, a rival card processor may use the blockchain to determine the rate at which the individual 104 earns miles through a branded card, to generate a more enticing offer to the individual 104 to use their own card rather than their competitor's card.

Analysis of Cardholder Promotional Offer Behavior

In some embodiments, the methods and systems discussed herein may be used for the storage and conveyance of data regarding the behavior of a new cardholder for a credit card or other payment instrument during an initial promotional period, such as may be used to estimate likely behavior of the cardholder following expiration of the promotional period.

In such an embodiment, the individual 104 may be a person, corporation, partnership, or other entity that may be issued a payment card or other payment instrument that may, as part of the issuance of the instrument thereto, be provided an offer or other benefit as part of an initial promotional period. The behavior of the individual 104 during the period may be tracked with respect to transactions conducted by the individual 104. The individual 104, the financial institution that issues the instrument to the individual 104, or merchants that may participate in transactions with the individual 104, may submit data to the blockchain regarding the individual's behavior during the promotional period. Such data may include, for instance, transaction data or data identified via analysis of transaction data, which may include, for example, number of transactions, frequency of transactions, average transaction amount, average product cost, geographic location, merchant categories, etc. The processing server 102 may verify this data with the other party (e.g., the individual 104 that participated in the payment transaction) and may seek verification from a verifying entity 114. In such embodiments, the verifying entity 114 may be the third party participant in the payment transaction, such as the financial institution that issued the payment instrument, the merchant with which the transaction was conducted, or the individual 104.

Once verified, the processing server 102 may add the data to a blockchain that is uniquely associated with the individual 104, or to a blockchain associated with multiple individuals 104 with the data being accompanied by a unique identifier value that is unique to the individual 104. Such a process may be repeated any time the individual 104 conducts additional transactions or other behavior of note. For instance, each time the individual 104 conducts a payment transaction during the promotional period, and, in some cases, for a predetermined time after the period expires, data associated therewith may be uploaded to the blockchain. A requesting entity 106, such as the financial institution that issued the payment instrument used in the promotional period, may request the blockchain associated with the individual and may evaluate the data stored therein to determine the individual's behavior during the period. For example, the financial institution may be interested to see if the individual 104 changed behavior for the promotional period and/or continued to use the payment instrument once the period expired, to determine if the individual 104 was genuinely interested in the instrument or was simply taking advantage of promotional offers. The verification process used by the processing server 102 and immutability of the blockchain can ensure that the requesting entity 106 is looking at the most up to date and accurate presentation of the individual's behavior during and/or after the promotional period. In another example, an entity wanting to offer a payment instrument to the individual 104 may use past behavior related to promotional offers to design a new promotional offer to be used to entice the individual 104.

Verification and Auditing of Insurance Claims

In some embodiments, the methods and systems discussed herein may be used for the storage of data related to insurance claims made by an individual or institution for use in the auditing thereof and future processing of claims, such as may be used to reduce fraud and provide more accurate coverage.

In such an embodiment, the individual 104 may be a person or other entity that is issued insurance, where the insurance may be for coverage of any suitable type, where claims made associated with that insurance may be tracked via storage in the blockchain for review by other, external entities. The insurance claims may be claims made by or on behalf of the individual 104 that are subsequently processed by the insuring entity using suitable methods and systems. The insuring entity or individual 104 may submit data to the blockchain regarding the insurance claim, to operate as an accounting to keep track of all insurance claims made by the individual 104. Such data may include, for example, date of the claim, language of the claim, type of claim, disposition of the claim, claim amount, amount paid, related incident data (e.g., police report numbers, vehicle identification numbers, etc.). The processing server 102 may verify this data with the other party (e.g., the individual 104 that submitted the claim if the data was submitted to the blockchain by the insuring entity) and may seek verification from a verifying entity 114. The verifying entity 114 may be, for example, a third party that participates in the handling of the claim or is otherwise involved in an incident to which the claim relates, such as a law enforcement agency that investigated an accident that spawned an auto insurance claim or an fire investigator that investigates a fire that spawned a home insurance claim.

Once verified, the processing server 102 may add the data to a blockchain that is uniquely associated with the individual 104 or a specific insurance product issued to the individual 104 (e.g., separate blockchains for home, auto, life insurance, etc.), or to a blockchain associated with multiple individuals 104 with the data being accompanied by an entity identifier or other value unique to the individual 104, and in some cases accompanied by or replaced by a value unique to a specific insurance product. Such a process may be repeated any time a new claim is made related to the insurance product, or any time claim data may be modified or appended. For instance, the blockchain may be updated any time the individual 104 makes a claim, as well as any time the insuring entity updates the status of the claim. A requesting entity 106, such as a potential insurer for a new insurance product or a fraud investigator, may request the blockchain associated with the individual 104 and may evaluate the data stored therein to evaluate the individual's claims made to determine if a new insurance product should be offered to the individual 104 or to determine the terms of such a product. For instance, if the individual 104 regularly submits false claims, or is found to be at fault for a large number of claims, the potential insurer may decide to back away from the individual 104. The verification process used by the processing server 102 and immutability of the blockchain can ensure that the requesting entity 106 is looking at up-to-date and accurate information regarding the individual's usage of their insurance product(s), ensuring that the individual 104, or other parties, cannot misrepresent their position. For example, two people may get into an automobile accident, where both my allege the other is at fault, but where the past histories of each of the people, identified via the blockchain, may provide for additional insight as to the trustworthiness of the claim from each.

Trusted History of Non-Financial Indicators

In some embodiments, the methods and systems discussed herein may be used for the storage and conveyance of data regarding non-financial indicators of an individual or entity that may be used by others in evaluating the trustworthiness or capabilities of the individual or entity.

In such an embodiment, the individual 104 may be a person or other type of entity, such as a business, whose non-financial behavior may be tracked via storage in the blockchain for review by other, external entities. The non-financial behavior may be behavior of the individual that may be relevant to an outside entity that may, in some cases, be combined with other, financial factors to evaluate the trustworthiness of the individual 104, such as with respect to extending credit to the individual 104, offering the individual 104 residence, or other situation where such data may be valuable. The non-financial behavior may be related to actions involving the individual 104 that may not be directly related to finance, such as the maintenance of utilities and property by the individual 104, the possession and data usage of a cellular device including the recharging of data or minutes on the device, the maintenance of a vehicle, adherence to rules and regulations, etc. An institution involved in non-financial behavior with the individual 104 may submit data to the blockchain regarding the behavior. Such data may include, for instance, time and date of the behavior, type of behavior, outcome of the behavior, period of occurrence for regularly occurring behavior, perceived value of the behavior, etc. The processing server 102 may verify this data with the other party (e.g., the individual 104), and may seek verification from a verifying entity 114. In such embodiments, the verifying entity 114 may be, for example, the financial institution that funded a transaction between the individual 104 and a vehicle maintenance provider, or the vehicle maintenance provider itself if the behavior data is submitted by the financial institution.

Once verified, the processing server 102 may add the data to a blockchain that is uniquely associated with the individual 104, or to a blockchain associated with multiple individuals 104 with the data being accompanied by a value unique to the individual 104. Such a process may be repeated any time an entity interacts with the individual 104 in a manner where such an interaction may be beneficial for storage in the blockchain. For instance, each time the individual 104 participates in an activity that may reflect on their trustworthiness or other suitable metric, data associated with the activity may be stored in the blockchain. A requesting entity 106, such as a financial institution looking to provide a line of credit to the individual 104, may request the blockchain associated with the individual 104, and may evaluate the data stored therein to determine the individual's trustworthiness based on non-financial factors. The verification process used by the processing server 102 and immutability of the blockchain may ensure that the requesting entity 106 is looking at accurate and updated information, in real-time, of the individual's non-financial behavior. In another example, a car purchaser may use the blockchain to verify the individual's maintenance and treatment of a vehicle before purchasing it from the individual 104.

Once verified, the processing server 102 may add the data to a blockchain that is uniquely associated with the financial institution, or to a blockchain associated with multiple financial institutions with the data being accompanied by an entity identifier or other value unique to the financial institution. Such a process may be repeated any time cash reserves of the financial institution are accessed and/or modified. For instance, an individual 104 may make a deposit with the financial institution, and the corresponding data uploaded to the blockchain. A requesting entity 106, such as a governmental agency performing an audit, may request the blockchain associated with the financial institution's cash reserves, and may evaluate the data stored therein to determine the cash reserves of the financial institution at or near real-time, as it would include the latest deposit as made by the individual 104. The verification process used by the processing server 102 and immutability of the blockchain can ensure that the requesting entity 106 is looking at the most up to date and accurate representation of the financial institution's cash reserves, ensuring that the financial institution cannot misrepresent their position. In another example, a loan provider wishing to evaluate an individual's assets may use the blockchain to verify the individual's position based on their cash reserves as indicated in the blockchain.

Verification of Product Authenticity

In some embodiments, the methods and systems discussed herein may be used for the storage and conveyance of data related to the authenticity of a product for sale, which may be used by entities wanting to purchase the product to be assured of the authenticity of the product through its life cycle.

In such an embodiment, the individual 104 may be a person or other entity interested in purchasing a product for sale. The product may be manufactured by one entity, but may be distributed, stocked, and sold by any number of other additional entities, where there are multiple opportunities for the product to be replaced by an illegitimate or fake product. Each product may have a unique identification value associated therewith that is unique to that product, which may be further unique from any other instance of that same product (e.g., two otherwise identical products have unique identifiers only associated with that single product). Data associated with the product may be submitted to the blockchain regarding its manufacture, sale, and distribution. Such data may include, for instance, dates, photographs, times, geographic locations, recordings, etc., which may be used to establish a chain of authenticity throughout a product's life. For instance, if the product identifier is embedded in the product, the use of the same product identifier throughout the distribution process may be sufficient to prove that the product was not replaced with a counterfeit. The processing server 102 may verify this data with another party (e.g., a first party that hands off the product to a second party where the second party makes the submission to the blockchain) and may seek verification from a verifying entity 114. In such embodiments, the verifying entity 114 may be, for example, the product manufacturer or an earlier entity involved in the distribution of the product, which may verify that the product is still the same as it was when handled by them.

Once verified, the processing server 102 may add the data to a blockchain that is uniquely associated with the product, or to a blockchain associated with multiple products with the data being accompanied by a unique identifier that is unique to that product. Such a process may be repeated through the lifecycle of the product any time it is modified, ownership or possession changes, or any other activity occurs that may be a potential for compromise of the authenticity of the product. For instance, each time the product chances hands a new submission may be made to the blockchain to confirm authenticity and identity of the product and its possessor. A requesting entity 106, such as a person wanting to purchase the product, may request the blockchain associated with the product and may evaluate the data stored therein to ensure that the product they are purchasing is authentic and has not been replaced or had its authenticity otherwise compromised. The verification process used by the processing server 102 and immutability of the blockchain can ensure that the requesting entity 106 is provided with accurate and trustworthy data regarding the authenticity of the product that cannot be modified or changed or fabricated by an entity involved in the distribution chain, ensuring that the requesting entity 106 is obtaining a genuine, and authentic product that is accurate to its manufacturer's specifications.

Organ Donation Inventory and Tracking

In some embodiments, the methods and systems discussed herein may be used to store data related to organ donation, including a list of registered donors, a list of awaiting recipients, and matching data.

In such an embodiment, the individual 104 may be an organ donor, a patient in need of a donor organ, or an entity acting on behalf of such an individual, such as a doctor, insurance provider, or other entity. The individual 104 may utilize the blockchain network 110 to store data associated with their health status and other information that would be used in matching their organs or to find a match for their desired organ. For instance, a donor may post the organs that they are willing to donate and relevant health information, such as blood type, while a potential recipient may post the organ that they need and their relevant health information. In cases where a transplant list is maintained, organ recipients may have their place on the list tracked on the blockchain as well. The processing server 102 may be configured to verify the information being added to the blockchain via the use of a verifying entity 114, which may be a doctor, nurse, insurance provider, hospital, governmental agency, or other entity involved in organ donation and matching.

Once the information being submitted (e.g., donor profile, recipient profile, modification to the transplant list, etc.) is verified, the processing server 102 may add data to a blockchain used in organ donation and matching. In some embodiments, a single blockchain may be associated with a type of organ, type of donation, or other delineation. In other embodiments, a single blockchain may be used for all organ donations, where each entry may specify criteria to which it relates (e.g., organ, location, etc.). The processing server 102 may add a new entry to the blockchain each time a profile or information needs to be modified, such as following actions performed by a transacting entity 108. The transacting entity 108, such as a transplant committee, may view details on the blockchain regarding organ recipients and organ donors to make matches and determine where donor organs should be provided to recipients, as well as determine updates that should be made to a transplant list. When changes need to be made, such as to modify the order of the transplant list, to update information regarding a recipient, or to make changes regarding the availability of a donor, the transacting entity 108 may contact the processing server 102, which may verify such changes through a verifying entity 114. For example, the transplant committee may request that the profile for a recipient be updated to reflect that they successfully received their transplant and are no longer in need of an organ, which may be verified by the recipient, their doctor, their insurance provider, or the hospital that performed the procedure.

Exemplary Method for Verified Data Storage via Blockchain

Figure 6:
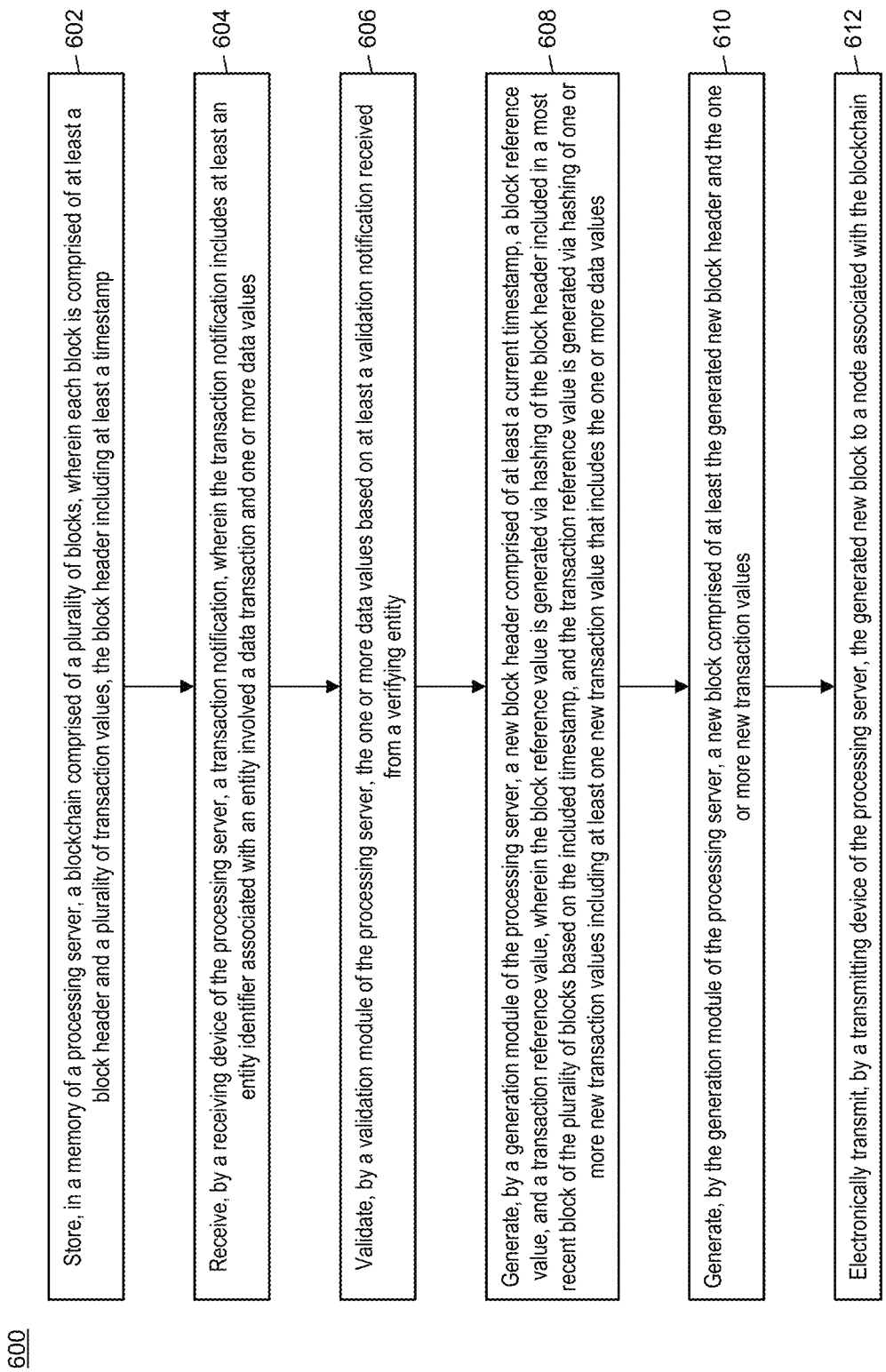
FIG. 6 is a flow chart illustrating an exemplary method for verified data storage via blockchain in accordance with exemplary embodiments.

FIG. 6 illustrates a method 600 for the storage of verified data via blockchain where the data is associated with a data transaction and verified via a third party associated therewith.

In step 602, a blockchain may be stored in a memory (e.g., the memory 228) of a processing server (e.g., the processing server 102), wherein the blockchain is comprised of a plurality of blocks, each block being comprised of at least a block header and a plurality of transaction values, where the block header includes at least a timestamp. In step 604, a transaction notification may be received by a receiving device (e.g., the receiving device 202) of the processing server, wherein the transaction notification includes at least an entity identifier associated with an entity involved a data transaction and one or more data values.

In step 606, the one or more data values may be validated by a validation module (e.g., the validation module 218) of the processing server based on at least a validation notification received from a verifying entity (e.g., the verifying entity 114). In step 608, a new block header may be generated by a generation module (e.g., the generation module 220) of the processing server comprised of at least a current timestamp, a block reference value, and a transaction reference value, wherein the block reference value is generated via hashing of the block header included in a most recent block of the plurality of blocks based on the included timestamp, and the transaction reference value is generated via hashing of one or more new transaction values including at least one new transaction value that includes the one or more data values.

In step 610, a new block may be generated by the generation module of the processing server comprised of at least the generated new block header and the one or more new transaction values. In step 612, the generated new block may be electronically transmitted by a transmitting device (e.g., the transmitting device 226) of the processing server to a node (e.g., a node 112) associated with the blockchain.

In one embodiment, validating the one or more data values may include: electronically transmitting, by the transmitting device of the processing server, a validation request to the verifying entity; and receiving, by the receiving device of the processing server, the validation notification from the verifying entity. In a further embodiment, the validation request may include the one or more data values, and the validation notification may include confirmation of the one or more data values. In another further embodiment, the validation request may include the entity identifier, and the validation notification may include the one or more data values. In a further embodiment, the validation request may not include the one or more data values.

In some embodiments, the transaction notification may be received from the entity (e.g., the individual 104) involved in the data transaction. In a further embodiment, validation of the one or more data values may be further based on at least a second validation notification received from a second entity (e.g., the transacting entity 108) involved in the data transaction. In one embodiment, the at least one transaction value that includes the one or more data values may further include the entity identifier. In some embodiments, the entity identifier may be a digital signature generated for the data transaction. In one embodiment, the blockchain may be included in a plurality of blockchains and uniquely associated with the entity identifier among the plurality of blockchains.

Computer System Architecture

Figure 7:
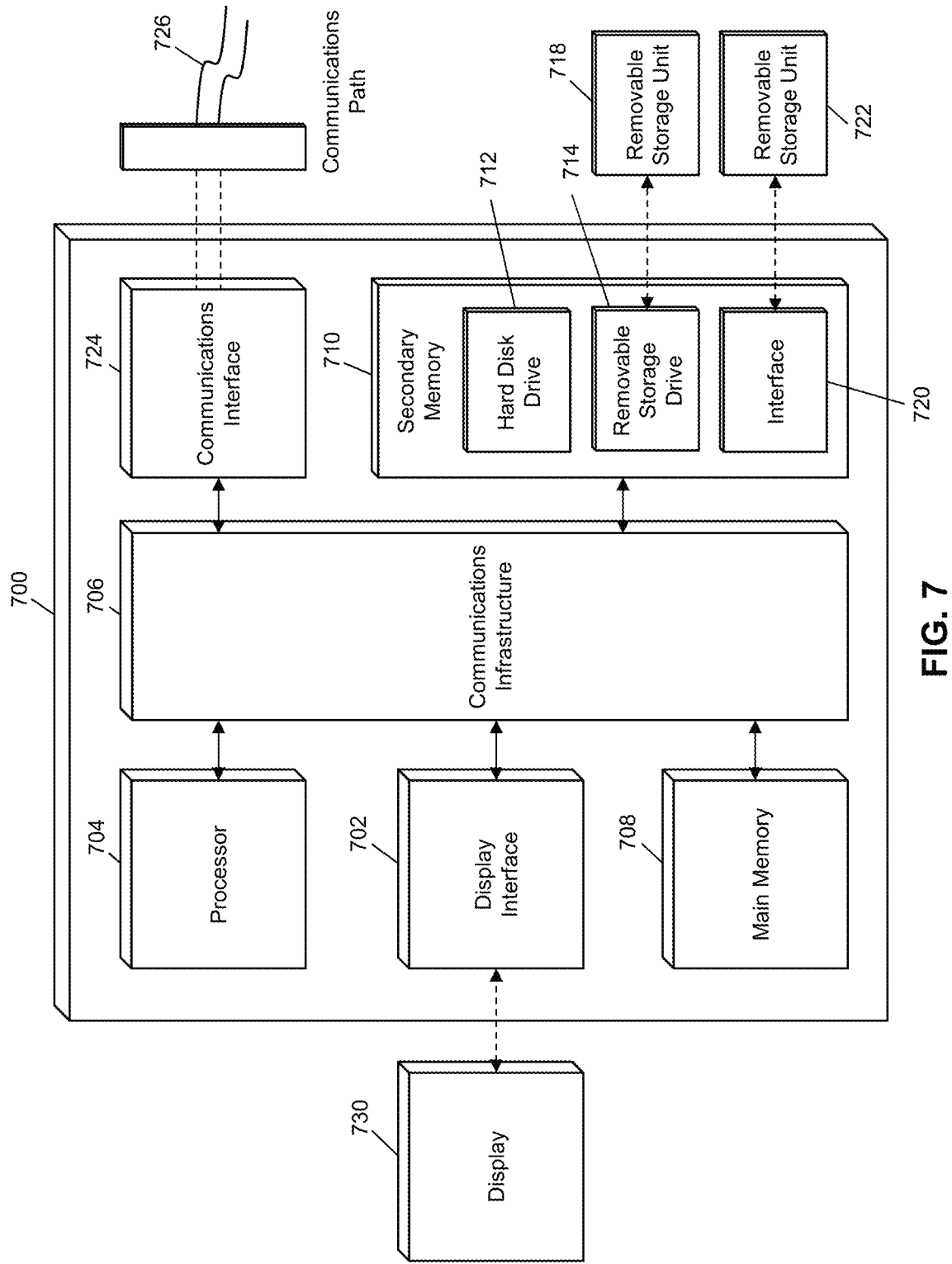
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 and user computing device 104 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for verified data storage via blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for verified data storage via blockchain, comprising:

receiving, by a receiving device of a processing server, a transaction notification from a transacting entity, wherein the transaction notification includes at least an entity identifier associated with the transacting entity involved in a data transaction and one or more data values associated with the data transaction, the entity identifier identifying a blockchain associated with the transacting entity;

electronically transmitting, by a transmitting device of the processing server, a validation request to a verifying entity, the verifying entity being an entity not involved in the data transaction, wherein the validation request does not require including the one or more data values;

receiving, by the receiving device of the processing server, a validation notification from the verifying entity, wherein the validation notification includes verification data associated with the transacting entity involved in the data transaction, wherein the verification data is independent of the verifying entity receiving the one or more data values from the processing server;

validating, by a validation module of the processing server, the one or more data values based on at least the verification data included in the validation notification received from the verifying entity;

generating, by a generation module of the processing server, a new block header comprised of at least a current timestamp, a block reference value, and a transaction reference value, wherein the block reference value is generated via hashing of the block header included in a most recent block of the plurality of blocks based on the included timestamp, and the transaction reference value is generated via hashing of one or more new transaction values including at least one new transaction value that includes the one or more data values;

generating, by the generation module of the processing server, a new block comprised of at least the generated new block header and the one or more new transaction values; and electronically transmitting, by the transmitting device of the processing server, the generated new block to a node associated with the blockchain.

2. The method of claim 1, wherein validating further comprises:

determining whether the validation notification includes information matching the one or more data values that are not transmitted to the verifying entity.

3. The method of claim 2, wherein the validation notification includes information that does not match the one or more data values that are not transmitted to the verifying entity, wherein the validating further comprises determining that the one or more data values are invalid.

4. The method of claim 2, wherein the validation notification includes information that matches the one or more data values that are not transmitted to the verifying entity, wherein the validating further comprises determining that the one or more data values are valid.

5. The method of claim 1, wherein
the validation request includes the entity identifier, and
the validation notification includes information corresponding to the one or more data values.

6. The method of claim 1, wherein the transaction notification is received from the entity involved in the data transaction.

7. The method of claim 6, wherein validation of the one or more data values is further based on at least a second validation notification received from a second entity involved in the data transaction.

8. The method of claim 1, wherein the at least one transaction value that includes the one or more data values further includes the entity identifier.

9. The method of claim 1, wherein the entity identifier is a digital signature generated for the data transaction.

10. The method of claim 1, wherein the blockchain is included in a plurality of blockchains and uniquely associated with the entity identifier among the plurality of blockchains.

11. A system for verified data storage via blockchain, comprising:
a memory;
a receiver of the processing server receiving a transaction notification from a transacting entity, wherein the transaction notification includes at least the transacting entity identifier associated with an entity involved in a data transaction and one or more data values associated with the data transaction, the entity identifier identifying a blockchain associated with the transacting entity;
a transmitter of the processing server electronically transmitting a validation request to a verifying entity, the verifying entity being an entity not involved in the data transaction, wherein the validation request does not require including the one or more data values,
wherein the receiver of the processing server receives a validation notification from the verifying entity, wherein the validation notification includes verification data associated with the transacting entity involved in the data transaction, wherein the verification data is independent of the verifying entity receiving the one or more data values from the processing server;
a validation module of the processing server validating the one or more data values based on at least the verification data included in the validation notification received from the verifying entity; and
a generation module of the processing server generating a new block header comprised of at least a current timestamp, a block reference value, and a transaction reference value, wherein the block reference value is generated via hashing of the block header included in a most recent block of the plurality of blocks based on the included timestamp, and the transaction reference value is generated via hashing of one or more new transaction values including at least one new transaction value that includes the one or more data values, and
the generation module of the processing server generating a new block comprised of at least the generated new block header and the one or more new transaction values,
wherein the transmitter of the processing server electronically transmits the generated new block to a node associated with the blockchain.

12. The system of claim 11, wherein the validation module further
determines whether the validation notification includes information matching the one or more data values that are not transmitted to the verifying entity.

13. The system of claim 12, wherein the validation notification includes information that does not match the one or more data values that are not transmitted to the verifying entity, wherein the validating module further determines that the one or more data values are invalid.

14. The system of claim 12, wherein the validation notification includes information that matches the one or more data values that are not transmitted to the verifying entity, wherein the validating module further determines that the one or more data values are valid.

15. The system of claim 11, wherein
the validation request includes the entity identifier, and
the validation notification includes information corresponding to the one or more data values.

16. The system of claim 11, wherein the transaction notification is received from the entity involved in the data transaction.

17. The system of claim 16, wherein validation of the one or more data values is further based on at least a second validation notification received from a second entity involved in the data transaction.

18. The system of claim 11, wherein the at least one transaction value that includes the one or more data values further includes the entity identifier.

19. The system of claim 11, wherein the entity identifier is a digital signature generated for the data transaction.

20. The system of claim 11, wherein the blockchain is included in a plurality of blockchains and uniquely associated with the entity identifier among the plurality of blockchains.

* * * * *